United States Patent
Yamasaki

(10) Patent No.: US 10,917,563 B2
(45) Date of Patent: Feb. 9, 2021

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Mari Yamasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/697,716

(22) Filed: Nov. 27, 2019

(65) Prior Publication Data
US 2020/0186706 A1 Jun. 11, 2020

(30) Foreign Application Priority Data

Dec. 7, 2018 (JP) .................................. 2018-230305
Dec. 7, 2018 (JP) .................................. 2018-230306

(51) Int. Cl.
*H04N 5/232* (2006.01)
(52) U.S. Cl.
CPC ..... *H04N 5/23232* (2013.01); *H04N 5/23296* (2013.01); *H04N 5/23299* (2018.08); *H04N 5/232127* (2018.08)
(58) Field of Classification Search
CPC ........... H04N 5/23232; H04N 5/23299; H04N 5/23296; H04N 5/232127; H04N 5/23245; H04N 5/3535; H04N 5/3454; H04N 7/0127; G09G 2340/0435
USPC ....................................................... 348/222.1
See application file for complete search history.

(56) References Cited

U.S. PATENT DOCUMENTS

| | | | | |
|---|---|---|---|---|
| 7,415,166 | B2* | 8/2008 | Kubota | H04N 1/3872 382/284 |
| 7,898,575 | B2* | 3/2011 | Ishii | H04N 5/3454 348/222.1 |
| 8,139,121 | B2* | 3/2012 | Ito | H04N 5/23245 348/222.1 |
| 8,358,782 | B2* | 1/2013 | Miller | H04N 7/0135 380/200 |
| 8,605,185 | B2* | 12/2013 | Border | H04N 5/2353 348/308 |
| 9,270,968 | B2* | 2/2016 | Suzuki | H04N 9/87 |
| 2007/0195182 | A1 | 8/2007 | Ito | |

(Continued)

FOREIGN PATENT DOCUMENTS

| | | |
|---|---|---|
| JP | 2003-111050 A | 4/2003 |
| JP | 2007-228019 A | 9/2007 |

(Continued)

*Primary Examiner* — Pritham D Prabhakher
(74) *Attorney, Agent, or Firm* — Venable LLP

(57) ABSTRACT

An obtainment unit obtains a captured image captured by an image capturing unit. A control unit sets, as a distribution target image which is to be distributed, an image of a partial region cut out from the captured image or an image obtained by capturing the partial region by controlling at least one of panning, tilting, and zooming of the image capturing unit, and, based on one of a distribution frame rate of the distribution target image and a set time period for distributing the distribution target image, controls the other of the distribution frame rate and the set time period. The distribution target image is distributed for the set time period in accordance with the distribution frame rate.

11 Claims, 17 Drawing Sheets

(56) References Cited

U.S. PATENT DOCUMENTS

| | | | |
|---|---|---|---|
| 2010/0066836 A1* | 3/2010 | Nakamura | H04N 21/4223 348/159 |
| 2010/0231738 A1* | 9/2010 | Border | H04N 5/772 348/222.1 |
| 2011/0261222 A1* | 10/2011 | Imamura | H04N 5/232 348/222.1 |
| 2011/0279701 A1* | 11/2011 | Imamura | H04N 5/23219 348/222.1 |
| 2013/0343732 A1* | 12/2013 | Suzuki | H04N 5/232 386/353 |
| 2015/0341569 A1 | 11/2015 | Takita et al. | |
| 2016/0112644 A1* | 4/2016 | Nishi | H04N 5/232939 348/222.1 |
| 2016/0213226 A1* | 7/2016 | Yanagidate | A61B 1/00036 |
| 2017/0208242 A1* | 7/2017 | Tsunematsu | H04N 5/781 |

FOREIGN PATENT DOCUMENTS

| | | |
|---|---|---|
| JP | 2009-265521 A | 11/2009 |
| JP | 2014-086782 A | 5/2014 |
| JP | 2015-222917 A | 12/2015 |

\* cited by examiner

[BEFORE ADJUSTMENT]

| NUMBER | SET TIME PERIOD [s] | FRAME INTERVAL [s] |
|---|---|---|
| 1 | 2 | 4 (0.25fps) |
| 2 | 5 | 4 |
| 3 | 4 | 4 |
| 4 | 1 | 4 |
| 5 | 6 | 4 |

[AFTER ADJUSTMENT]

| NUMBER | SET TIME PERIOD [s] | FRAME INTERVAL [s] |
|---|---|---|
| 1 | 4 | 4 (0.25fps) |
| 2 | 5 | 4 |
| 3 | 4 | 4 |
| 4 | 4 | 4 |
| 5 | 6 | 4 |

[BEFORE ADJUSTMENT]

| NUMBER | SET TIME PERIOD [s] | FRAME INTERVAL [s] |
|---|---|---|
| 1 | 2 | 4 (0.25fps) |
| 2 | 5 | 4 |
| 3 | 4 | 4 |
| 4 | 1 | 4 |
| 5 | 6 | 4 |

⇩

[AFTER ADJUSTMENT]

| NUMBER | SET TIME PERIOD [s] | FRAME INTERVAL [s] |
|---|---|---|
| 1 | 2 | 2 (0.5fps) |
| 2 | 5 | 4 (0.25fps) |
| 3 | 4 | 4 |
| 4 | 1 | 1 (1fps) |
| 5 | 6 | 4 |

| NUMBER | IMAGE REGION | STILL TIME PERIOD (s) | FRAME RATE (fps) | AMOUNT OF MOTION |
|---|---|---|---|---|
| 1 | A | 10 | 15 | ▰▰▰▱ —54005 |
| 2 | B | 5 | 10 | ▰▱▱▱ —54006 |
| 3 | C | 10 | 30 | ▰▰▰▱ —54007 |
| FRAME RATE (fps) | | <PLEASE SET NUMERICAL VALUE> | | —54008 |

APPLY   CLEAR
54009   54010

| NUMBER | IMAGE REGION | STILL TIME PERIOD (s) | FRAME RATE (fps) |
|---|---|---|---|
| 1 | A | 8 | 30 |
| 2 | B | 5 | 15 |
| 3 | C | 10 | 30 |
| 4 | D | 3 | 15 |
| 5 | E | 10 | 30 |

57001

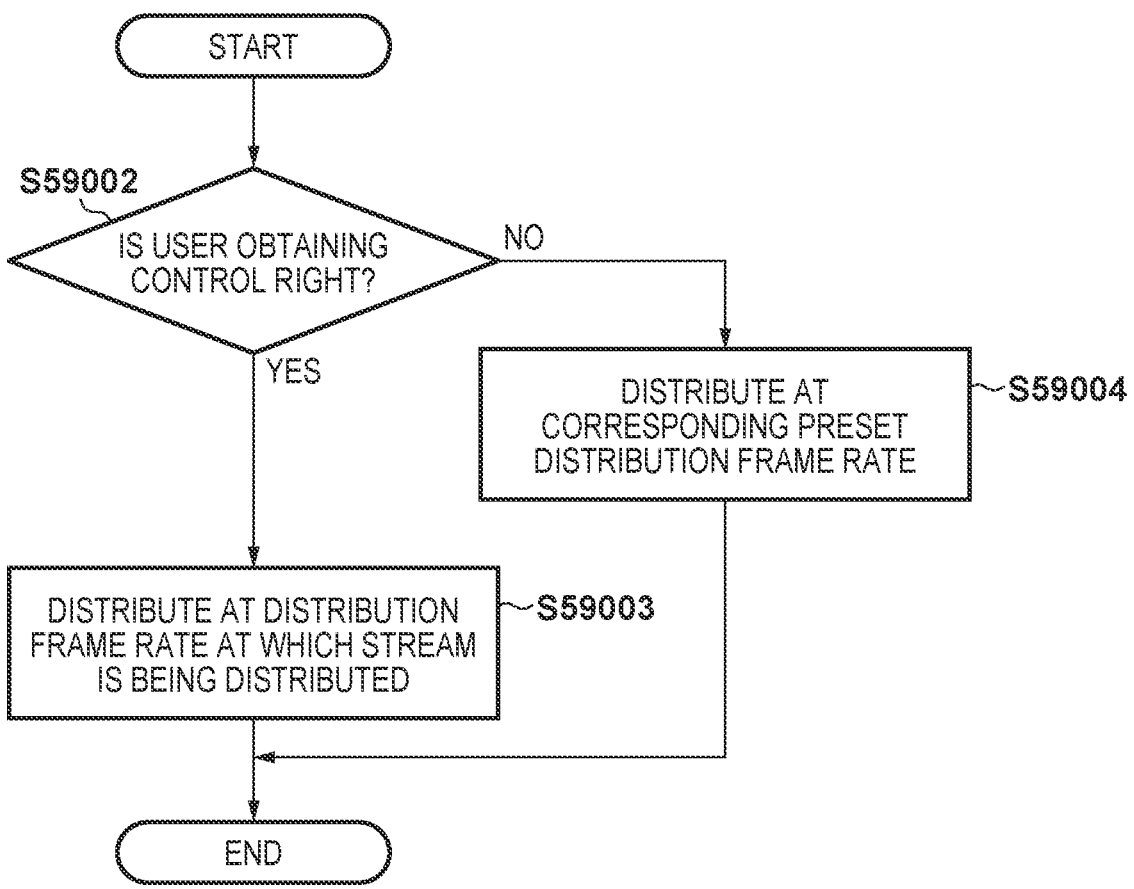

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to a technique related to distribution of video of regions that are sequentially switched between.

Description of the Related Art

Conventionally, there has been known a network camera system for controlling a camera by remote control via a network or a dedicated line, and monitoring video taken by the camera. In addition, there is a network camera system that can control image quality parameters such as focus, zoom, exposure, resolution, and white balance of a camera, and has a function of distributing a plurality of different cut-out images at a time of shooting and a function of controlling a frame rate.

In a distribution setting for a cut-out image, there is also known a device having a preset function of storing a cut-out position of an image in advance. In addition, there is also known a function of performing image distribution while sequentially switching a cut-out position of an image at regular intervals, and this function is called a preset cycle function. In the preset cycle function, a still time period, which is an image distribution time period, is set for each cut-out position, and the cut-out position is switched on the basis of the still time period. Image distribution during the preset cycle is performed based on a setting value for the frame rate.

For example, in Japanese Patent Laid-Open No. 2015-222917, based on a feature amount of data, a consecutive-display time period is designated for a case where images corresponding to data for which a feature amount is detected are displayed on a display apparatus, and respective images are switched between and displayed on the display apparatus every consecutive-display time period.

However, the conventional technique disclosed in Japanese Patent Laid-Open No. 2015-222917 is a technique of adjusting the consecutive-display time period in accordance with feature amounts of data including captured images and switching between images based on the consecutive-display time period to cause a display apparatus to display an image, and distribution is not being performed in consideration of movement of a cut-out position of an image.

In addition, in a preset cycle function, when a preset still time period is shorter than a frame interval set in accordance with a frame rate, there are cases where in conjunction with movement of the cut-out position of the image, a cut-out image of the preset still time period is not distributed.

For example, in Japanese Patent Laid-Open No. 2007-228019, based on a feature amount of data, a consecutive-display time period, for a case where images corresponding to data for which the feature amount is detected are displayed on a display apparatus, is designated, and respective images are switched between and displayed on the display apparatus every consecutive-display time period. For example, in Japanese Patent Laid-Open No. 2009-265521, in a video in which an OSD (on-screen display) is synthesized, a frame rate is set for each of two regions: one for an OSD portion and one for a non-OSD portion.

However, in the conventional technique disclosed in the above-mentioned Japanese Patent Laid-Open No. 2007-228019, a region in which a plurality of capturing regions are set in a light-receiving region is divided, and a frame rate is set for each capturing region. This technique is for controlling a timing of reading a signal from the light-receiving region for each capturing region based on a set frame rate, and does not switch the frame rate for each designated region registered in a preset cycle function.

In addition, in the conventional technique disclosed in the above-mentioned Japanese Patent Laid-Open No. 2009-265521, frame rate conversion without a harmful effect is realized with respect to a video in which an OSD is synthesized. In the conventional technique disclosed in Japanese Patent Laid-Open No. 2009-265521, the frame rate conversion processing is performed by dividing between two regions, the OSD portion and the non-OSD portion, but the frame rate is not switched for each designated region registered in a preset cycle function.

Further, in the prior art, when a preset cycle function is executed, even if a level of interest, an objective, the amount of change of a video, and the still time period are different for each region in a wide range image or the like, the only setting that can be made is to set the same frame rate for all the cut-out positions.

In addition, in a preset cycle function, when it is desired to distribute a region with a high level of interest such as one where many subjects with a high speed appear such as a roadway, or a region with a large amount of change between frames at a high distribution frame rate, other regions are also distributed at the high distribution frame rate. As a result, there is a problem that the amount of data increases and the network load increases.

SUMMARY OF THE INVENTION

The present invention provides a technique for, with respect to all partial images in a captured image, enabling distribution of an image of a partial region or an image obtained by capturing the partial region.

According to the first aspect of the present invention, there is provided an image processing apparatus comprising: an obtainment unit configured to obtain a captured image captured by an image capturing unit; and a control unit configured to set, as a distribution target image which is to be distributed, an image of a partial region cut out from the captured image or an image obtained by capturing the partial region by controlling at least one of panning, tilting, and zooming of the image capturing unit, and, based on one of a distribution frame rate of the distribution target image and a set time period for distributing the distribution target image, control the other of the distribution frame rate and the set time period, wherein the distribution target image is distributed for the set time period in accordance with the distribution frame rate.

According to the second aspect of the present invention, there is provided an image processing method, comprising: obtaining a captured image captured by an image capturing unit, setting, as a distribution target image which is to be distributed, an image of a partial region cut out from the captured image or an image obtained by capturing the partial region by controlling at least one of panning, tilting, and zooming of the image capturing unit, and, based on one of a distribution frame rate of the distribution target image and a set time period for distributing the distribution target image, controlling the other of the distribution frame rate and the set time period, wherein the distribution target image is distributed for the set time period in accordance with the distribution frame rate.

According to the third aspect of the present invention, there is provided a non-transitory computer-readable storage medium storing a computer program for causing a computer to function as: an obtainment unit configured to obtain a captured image captured by an image capturing unit; and a control unit configured to set, as a distribution target image which is to be distributed, an image of a partial region cut out from the captured image or an image obtained by capturing the partial region by controlling at least one of panning, tilting, and zooming of the image capturing unit, and, based on one of a distribution frame rate of the distribution target image and a set time period for distributing the distribution target image, control the other of the distribution frame rate and the set time period, wherein the distribution target image is distributed for the set time period in accordance with the distribution frame rate.

Further features of the present invention will become apparent from the following description of exemplary embodiments (with reference to the attached drawings).

BRIEF DESCRIPTION OF THE DRAWINGS

FIG. 21 is a flowchart of processing for setting a distribution frame rate.

DESCRIPTION OF THE EMBODIMENTS

Embodiments of the present invention will be described below with reference to the accompanying drawings. Note that embodiments described below merely illustrate examples of specifically implementing the present invention, and are only specific embodiments of a configuration defined in the scope of the claims.

First Embodiment

Figure 1:
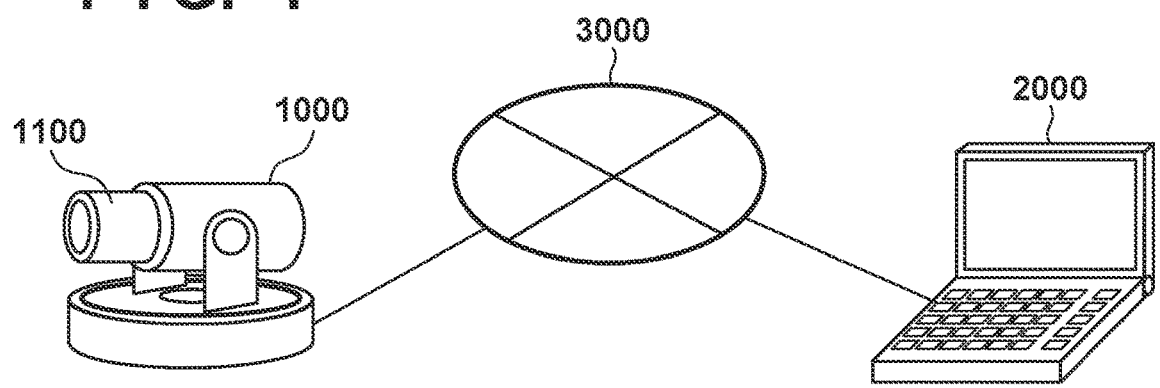
FIG. 1 is a diagram illustrating an example of an appearance of a network camera system.

First, a network camera system according to the present embodiment will be described with reference to FIG. 1, which illustrates an example of an appearance of the system. As illustrated in FIG. 1, the network camera system according to the present embodiment has a monitoring camera 1000 and a client apparatus 2000. The monitoring camera 1000 and the client apparatus 2000 are connected to a wired and/or wireless network 3000, and are configured to be able to communicate data with each other via the network 3000.

The monitoring camera 1000 has a housing 1100 that includes a lens, and also has a pan drive mechanism, a tilt drive mechanism, and a zoom drive mechanism, and these drive mechanisms operate in accordance with an instruction from the client apparatus 2000. The pan drive mechanism is a drive mechanism for changing the capturing direction of the monitoring camera 1000 in the pan direction. The tilt drive mechanism is a drive mechanism for changing the capturing direction of the monitoring camera 1000 in the tilt direction. The zoom drive mechanism is a drive mechanism for changing an angle of view of the monitoring camera 1000.

The client apparatus 2000 is a computer device such as a personal computer (PC), a tablet terminal device, or a smart phone, and performs various settings and instructions with respect to the monitoring camera 1000, and receives a captured image outputted from the monitoring camera 1000.

Figure 2:
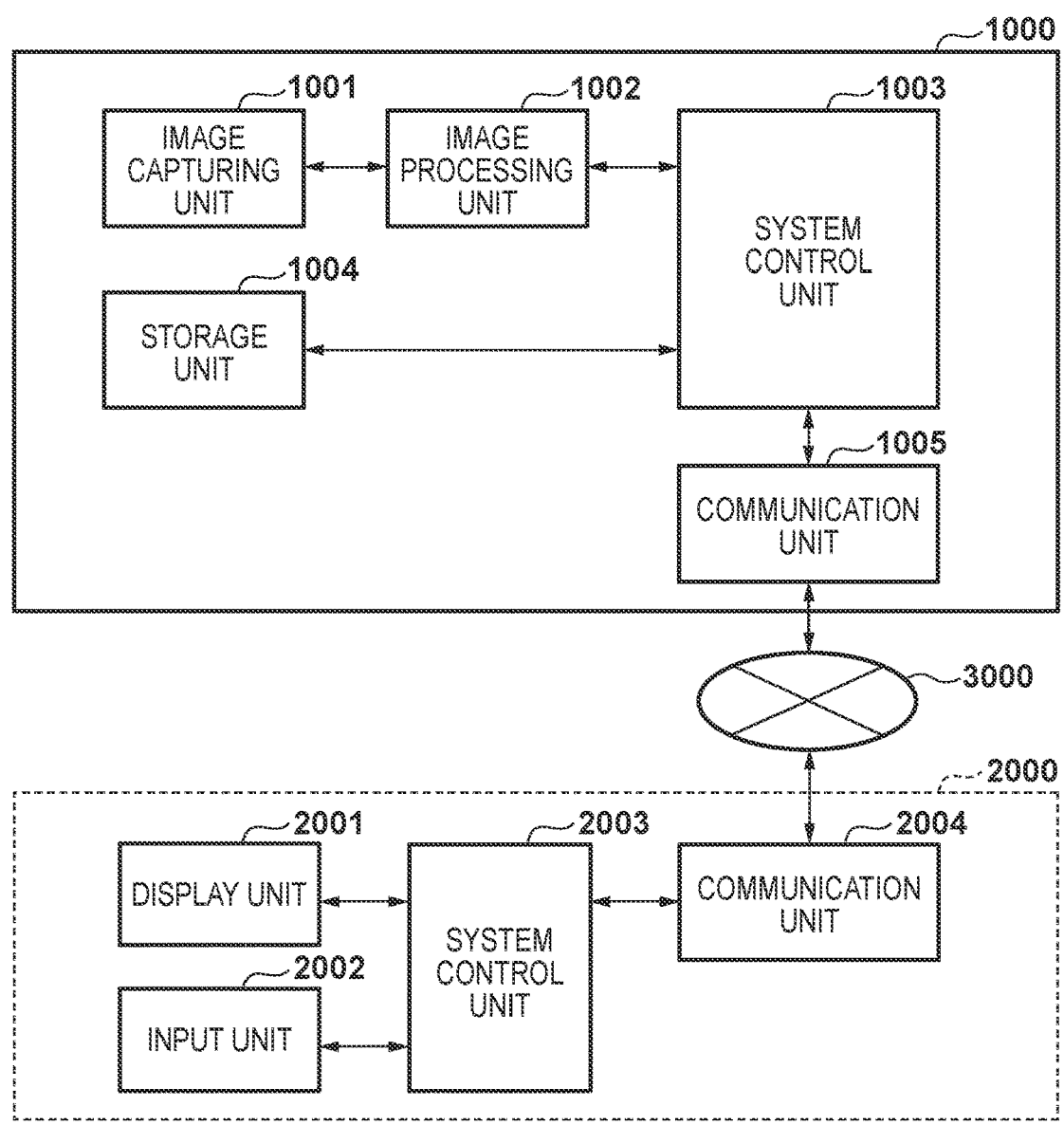
FIG. 2 is a block diagram illustrating an example of a functional configuration of each of a monitoring camera 1000 and a client apparatus 2000.

An example of a functional configuration of each of the monitoring camera 1000 and the client apparatus 2000 will be described with reference to the block diagram of FIG. 2. First, an example of the functional configuration of the monitoring camera 1000 will be described.

The image capturing unit 1001 has an image capturing element and a lens group (optical system) that includes a focus lens and a zoom lens. Light from the external world is received by the image capturing element via an optical system, and an image signal corresponding to the received light is outputted from the image capturing element.

An image processing unit 1002 performs various types of image processing on an image signal from the image capturing unit 1001 to generate and output an image signal (a captured image) that has been subjected to image processing. The image processing unit 1002 may compress and encode the generated captured image before outputting it.

A storage unit 1004 stores information groups necessary for the operation of the monitoring camera 1000, such as various types of information transmitted from the client apparatus 2000 and other information calculated from the various types of information.

A system control unit 1003 has one or more processors and a memory. The processor executes processing using a computer program and data stored in the memory to control the operation of the entire monitoring camera 1000, and executes or controls various processing described later as being performed by the monitoring camera 1000.

When the system control unit 1003 receives a camera control command from the client apparatus 2000, the system control unit 1003 performs processing according to the camera control command. For example, when the system control unit 1003 receives an instruction to change the zoom or the focal length as a camera control command, the system control unit 1003 instructs the zoom drive mechanism to change the zoom or the focal length in accordance with the instruction. In addition, for example, when the system control unit 1003 receives an instruction to change the pan angle as a camera control command, the system control unit 1003 instructs the aforementioned pan drive mechanism to change the pan angle in accordance with the instruction. In addition, for example, when the system control unit 1003 receives an instruction to change the tilt angle as a camera control command, the system control unit 1003 instructs the aforementioned tilt drive mechanism to change the tilt angle in accordance with the instruction.

The system control unit 1003 reads and writes information from and to the storage unit 1004, and distributes a captured image obtained by the image processing unit 1002 to the client apparatus 2000. A communication unit 1005 is an interface for performing data communication with the client apparatus 2000 via the network 3000.

Next, the client apparatus 2000 will be described. A display unit 2001 is configured by a liquid crystal screen, a touch panel screen, or the like, and can display a result of processing by the system control unit 2003 in accordance with an image, characters, or the like. The display unit 2001 displays, for example, a captured image received from the monitoring camera 1000, a graphical user interface (GUI) described below, and the like.

An input unit 2002 is a user interface such as a keyboard, a mouse, and a touch panel screen, and can input various instructions and information to the client apparatus 2000 upon operation by a user.

A system control unit 2003 has one or more processors and a memory. The processor executes processing using a computer program and data stored in the memory to control the operation of the entire client apparatus 2000, and executes or controls various processing described later as being performed by the client apparatus 2000. A communication unit 2004 is an interface for performing data communication with the monitoring camera 1000 via the network 3000.

Figure 8:
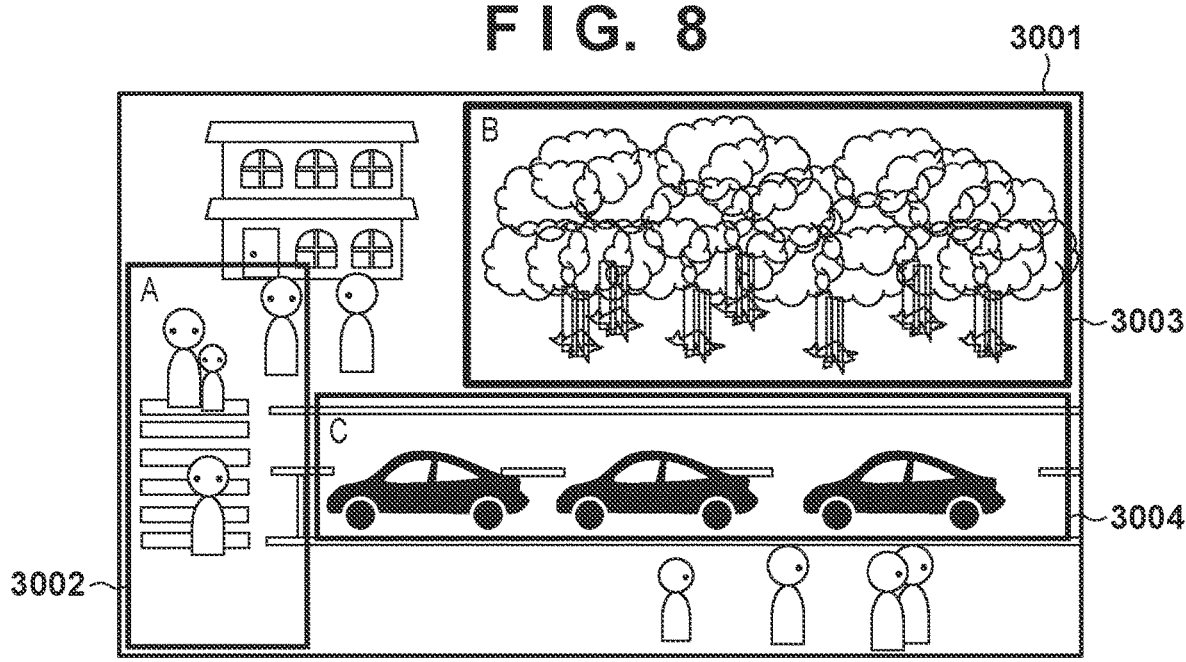
FIG. 8 is a diagram illustrating an example of distribution target regions.

Next, FIG. 8 illustrates an example of each image region (distribution target region) set as a distribution target image region (partial region) in a captured image in accordance with the monitoring camera 1000. A captured image 3001 is a captured image obtained by capturing a wide range by the monitoring camera 1000. An image region 3002 (image region name: A), an image region 3003 (image region name: B), and an image region 3004 (image region name: C) are set as distribution target regions on the captured image 3001.

For example, the monitoring camera 1000 distributes a video (captured images of a plurality of frames) corresponding to the image region 3002 to the client apparatus 2000 at a distribution frame rate set for the image region 3002 for a set time period that is set for the image region 3002. Then, the monitoring camera 1000 switches the distribution target image region from the image region 3002 to the image region 3003.

The monitoring camera 1000 then distributes a video (captured images of a plurality of frames) corresponding to the image region 3003 to the client apparatus 2000 at a distribution frame rate set for the image region 3003 for a set time period that is set for the image region 3003. Then, the monitoring camera 1000 switches the distribution target image region from the image region 3003 to the image region 3004.

The monitoring camera 1000 then distributes a video (captured images of a plurality of frames) corresponding to the image region 3004 to the client apparatus 2000 at a distribution frame rate set for the image region 3004 for a set time period that is set for the image region 3004.

In this manner, video (captured images of a plurality of frames) corresponding to the image regions 3002, 3003, and 3004 are distributed repeatedly in this order. Such a function is hereinafter referred to as a preset cycle function.

Note that there are various methods for distributing the video corresponding to an image region of interest (image regions 3002, 3003, and 3004), and there is no limitation to a specific method. For example, the monitoring camera 1000 may control at least one of the panning, tilting, and zooming of the monitoring camera 1000 to capture an image region of interest as a capturing region, and distribute video obtained by the capturing as a "video corresponding to the image region of interest" (distribution target image). Further, for example, the monitoring camera 1000 may distribute a video in an image region of interest cut out from the captured video as a "video corresponding to the image region of interest".

Figure 3:
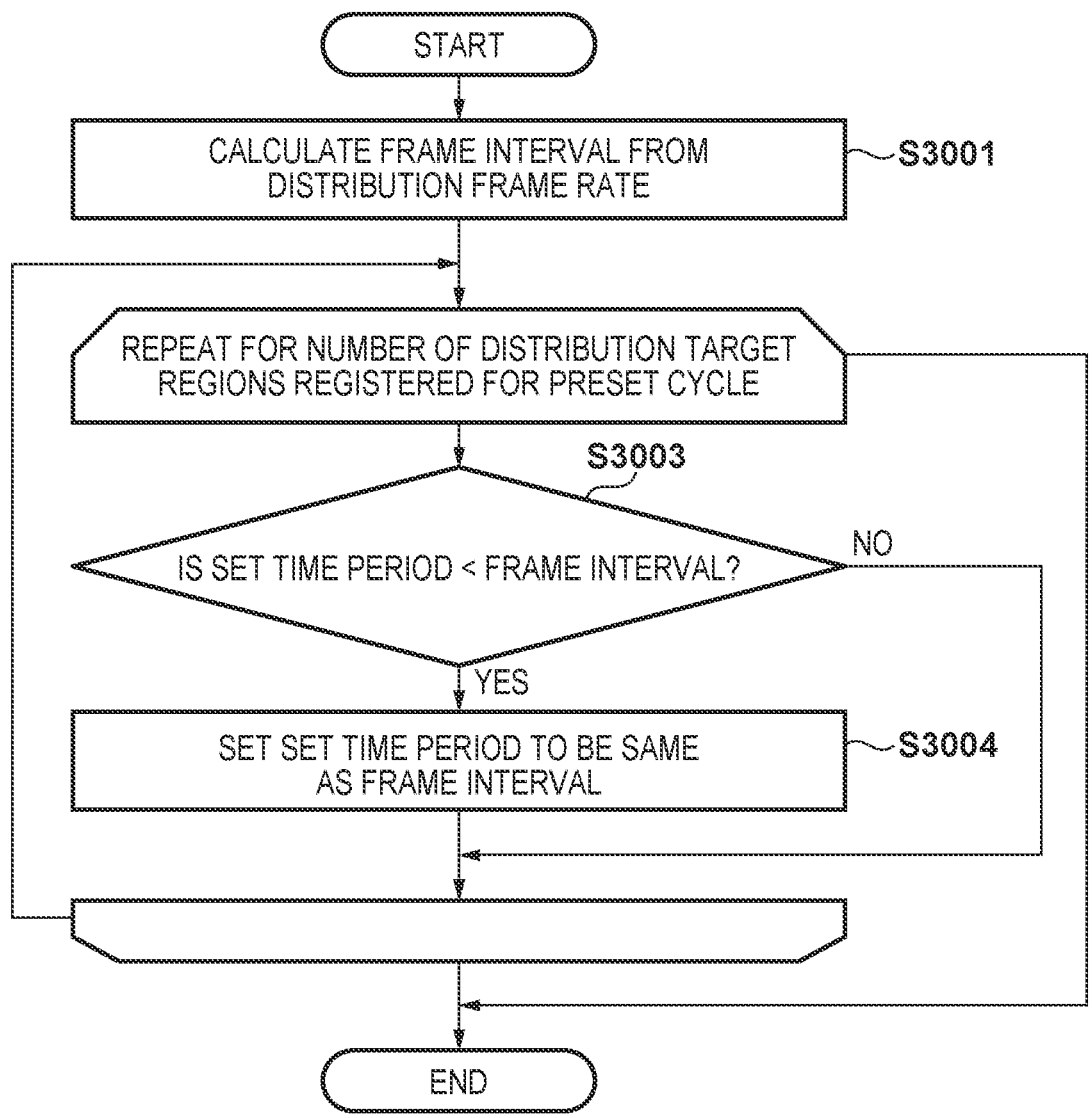
FIG. 3 is a flowchart of processing performed by the monitoring camera 1000.

Next, processing performed by the monitoring camera 1000 to set (adjust) the above-mentioned set time period corresponding to each distribution target region based on the distribution frame rate will be described with reference to the flowchart of FIG. 3. The processing according to the flowchart of FIG. 3 is performed immediately after setting for the preset cycle function or at least before the execution of the preset cycle function.

In step S3001, the system control unit 1003 reads out, from the storage unit 1004, the distribution frame rates set for the respective distribution target regions to be subjected to the preset cycle function. Then, the system control unit 1003 obtains, for each distribution target region, the inverse of the distribution frame rate of the distribution target region as the frame interval corresponding to the distribution target region. For example, when the distribution frame rate is 0.5 fps, the frame interval is 2 seconds. Then, the system control unit 1003 performs the processing of step S3003 and the processing of step S3004 for each distribution target region which is a target of the preset cycle function.

In step S3003, the system control unit 1003 selects one unselected distribution target region as a selected distribution target region from among the distribution target regions to be subjected to the preset cycle function. Then, the system control unit 1003 determines whether or not the set time period that has been set for the selected distribution target region is less than the frame interval obtained in step S3001 for the selected distribution target region.

If, as a result of the determination, the set time period that has been set for the selected distribution target region is less than the frame interval obtained in step S3001 for the selected distribution target region, the processing advances to step S3004. In contrast, if the set time period that has been set for the selected distribution target region is greater than or equal to the frame interval obtained in step S3001 for the selected distribution target region, the processing returns to step S3003, and the processing of step S3003 is performed for another selected distribution target region.

In step S3004, the system control unit 1003 changes (sets) the set time period that has been set for the selected distribution target region to the frame interval obtained in step S3001 for the selected distribution target region.

An example of the processing for setting the set time period of the distribution target region by the processing according to the flowchart of FIG. 3 will be described with reference to FIG. 5. The upper part of FIG. 5 illustrates the set time period and the frame interval of each distribution target region before the processing according to the flowchart of FIG. 3 is performed, and the lower part of FIG. 5 illustrates the set time period and the frame interval of each distribution target region after the processing according to the flowchart of FIG. 3 is performed.

Figure 5:
FIG. 5 is a diagram illustrating an example of a process for setting a set time period of a distribution target region.

In FIG. 5, "number" is a number unique to each distribution target region, and is, for example, a number representing a distribution order. The "set time period [s]" is a time period for distributing the video corresponding to the distribution target region, as described above. In the example at the upper of FIG. 5, the monitoring camera 1000 would repeat the following cycle.

Cycle: distribution of video corresponding to the distribution target region of number "1" for 2 seconds→distribution of video corresponding to the distribution target region of number "2" for 5 seconds→distribution of video corresponding to the distribution target region of number "3" for 4 seconds→distribution of video corresponding to the distribution target region of number "4" for 1 second-→distribution of video corresponding to the distribution target region of number "5" for 6 seconds.

The "frame interval [s]" is the inverse of the distribution frame rate, as described above. In the example in the upper part of FIG. 5, since the distribution frame rate for the respective distribution target regions whose "number"s are 1 to 5 is "0.25 fps", the frame interval of the respective distribution target regions whose "number"s are 1 to 5 is "4" which is the inverse of the frame rate.

Here, the set time periods (5, 4, 6 respectively) of the distribution target region corresponding to where "number" is 2, 3, and 5 are greater than or equal to 4, which is the frame interval. However, the set time periods (respectively 2 and 1) of the distribution target region corresponding to where "number" is 1 and 4 are less than 4, which is the frame interval. Therefore, by the processing according to the flowchart of FIG. 3, as illustrated in the lower part of FIG. 5, the set time period (2, 1) of the distribution target regions corresponding to where "number" is 1 and 4 is changed to 4, which is the frame interval.

When a change of a set time period is made in this way, the system control unit 1003 of the monitoring camera 1000 may notify the client apparatus 2000 accordingly. Upon receiving this notification, the client apparatus 2000 may display, on the display unit 2001, a changed set time period or information relating to the distribution target region for which the set time period has been changed.

In the storage unit 1004, initial values of the set time period and the distribution frame rate of each distribution target region are set, and these initial values can be changed from the client apparatus 2000. For example, when the user operates the input unit 2002 to set the set time period and the distribution frame rate of the distribution target region, the set time period and the distribution frame rate that were set are transmitted to the monitoring camera 1000 via the communication unit 2004, and are stored in the storage unit 1004. Upon obtaining the set time period from the distribution frame rate stored in the storage unit 1004, the system control unit 1003 of the monitoring camera 1000 also stores the obtained set time period in the storage unit 1004.

Figure 4:
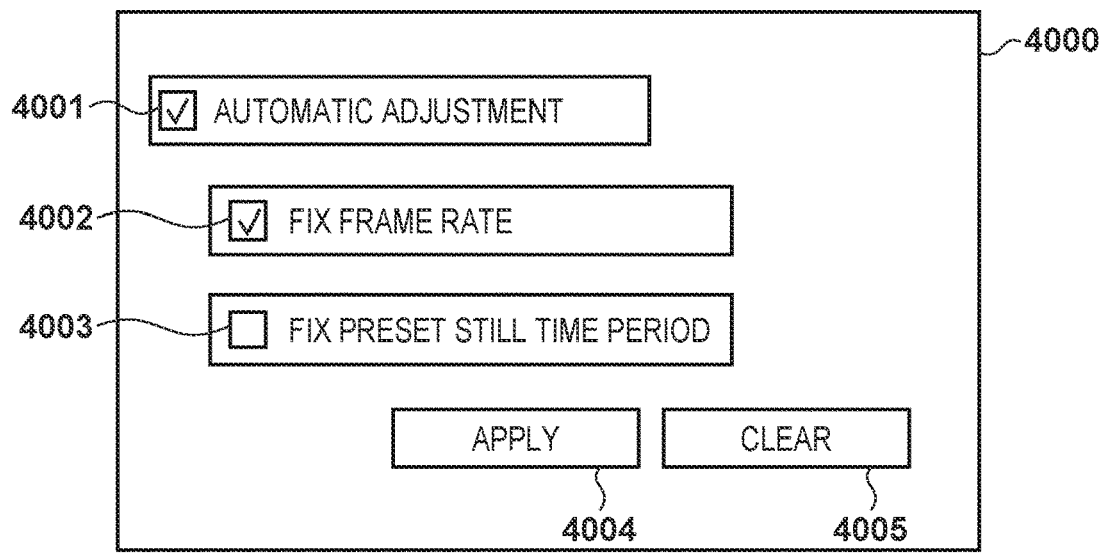
FIG. 4 is a diagram illustrating a configuration example of a GUI for setting a set time period for a distribution target region.

FIG. 4 illustrates a configuration example of a GUI for setting a set time period for a distribution target region. The GUI 4000 of FIG. 4 is an example of a setting page GUI for a preset cycle function of the setting page of the monitoring camera 1000, for example, and is displayed on the display unit 2001. Hereinafter, display control of the GUI and processing executed in response to a user operation on the GUI are all performed by the system control unit 2003.

When the user operates the input unit 2002 to turn on the check box 4001 (add a check mark), the check box 4002 and the check box 4003 enter an operable state, and the user can perform an operation to turn on only one of the check boxes 4002 and 4003.

When the user operates the input unit 2002 to turn on the check box 4002, the check box 4003 is turned off (its check mark is removed). In contrast, when the user operates the input unit 2002 to turn on the check box 4003, the check box 4002 is turned off.

The processing according to the flowchart of FIG. 3 is executed when the check box 4002 is in the on state, and is not executed when the check box 4002 is in the off state. The check box 4003 will be described in a second embodiment below.

When the user operates the input unit 2002 to instruct the button 4004 while the check box 4002 is on, the system control unit 2003 generates setting information for making an instruction to perform processing according to the flowchart of FIG. 3. Description is given in the second embodiment regarding processing performed by the system control unit 2003 when the user operates the input unit 2002 to instruct the button 4004 while the check box 4002 is off. Then, the system control unit 2003 transmits the generated setting information to the monitoring camera 1000 via the communication unit 2004. The system control unit 1003 of the monitoring camera 1000 stores the setting information transmitted from the client apparatus 2000 in the storage unit 1004. If the setting information is "setting information for making an instruction to perform processing according to the flowchart of FIG. 3", the system control unit 1003 executes processing according to the flowchart of FIG. 3. The operation of the monitoring camera 1000 in the case where the setting information is "setting information for making an instruction to not perform processing according to the flowchart of FIG. 3" will be described in the second embodiment. In contrast, when the user operates the input unit 2002 to instruct the button 4005, the content set in the GUI of FIG. 4 returns to the content before any change.

Figure 6:
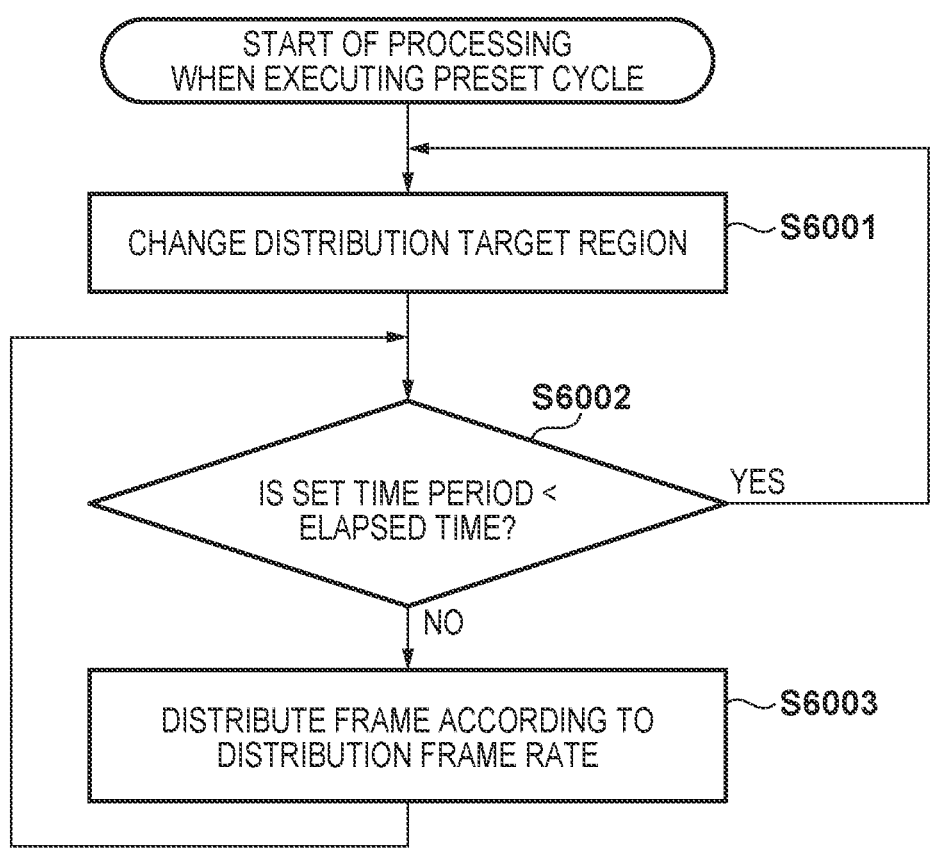
FIG. 6 is a flowchart of processing performed by the monitoring camera 1000.

Next, a process performed by the monitoring camera 1000 for distributing a video corresponding to each distribution target region according to the preset cycle function will be described with reference to the flowchart of FIG. 6.

In step S6001, the system control unit 1003 switches the distribution target region for which video is to be distributed. In step S6002, the system control unit 1003 determines whether or not the elapsed time since the process shifted to step S6002 (the elapsed time after switching the distribution target region) exceeds the set time period that is set for the switched distribution target region. Time measurement is performed by, for example, an internal timer included in the system control unit 1003.

As a result of this determination, when the elapsed time exceeds the set time period, the processing proceeds to step S6001. In contrast, when the elapsed time does not exceed the set time period, the processing proceeds to step S6003.

In step S6003, the system control unit 1003 distributes the video corresponding to the switched distribution target region according to the distribution frame rate set for the distribution target region. As described above, according to the present embodiment, it is possible to distribute video corresponding to all the distribution target regions which are the targets of the preset cycle function.

Note that, in the present embodiment, it is given that the processing according to the flowchart of FIG. 3 is performed immediately after setting for the preset cycle function or at least before the execution of the preset cycle function, but there is no limitation to this. For example, configuration may be taken such that, after one round of switching to each distribution target region that is a target of the preset cycle function, the process according to the flowchart of FIG. 3 is performed to adjust the set time period, and in second and subsequent rounds, the preset cycle function is performed according to the adjusted set time period.

Second Embodiment

In each of the following embodiments including the present embodiment, description is given regarding differences from the first embodiment, and assume that it is similar to the first embodiment unless otherwise stated below. In the present embodiment, description is given regarding processing performed by the system control unit 1003 in accordance with setting information generated by the system control unit 2003 when, in a state where the check box 4003 is turned on, a user operates the input unit 2002 to instruct the button 4004.

When it is not desirable to change the set time period, the distribution frame rate may be made variable by turning on the check box 4003, thereby distributing video corresponding to all the distribution target regions which are the targets of the preset cycle function. In the present embodiment, the monitoring camera 1000 performs video distribution by performing processing according to the flowchart of FIG. 7 instead of the processing according to the flowcharts of FIGS. 3 and 6.

In step S7001, the system control unit 1003 reads out, from the storage unit 1004, the distribution frame rates set for the respective distribution target regions that are to be targets of the preset cycle function. Then, the system control unit 1003 obtains, for each distribution target region, the inverse of the distribution frame rate of the distribution target region as the frame interval corresponding to the distribution target region.

Then, the system control unit 1003 repeats the processing of step S7002 to step S7009 until the stop condition of the preset cycle function is satisfied. The stop condition of the preset cycle function is not limited to a specific condition. For example, there are a case where "an instruction to stop the preset cycle function has been received from the client apparatus 2000" and a case where "an instruction to stop the preset cycle function has been input by the user operating an operation unit (not illustrated) in the monitoring camera 1000".

In step S7003, the system control unit 1003 sets the distribution target region currently selected as the image region for which video is to be distributed as a distribution target region of interest (a partial region of interest), and distributes one frame of video corresponding to the distribution target region of interest. Then, the system control unit 1003 repeats the processing of step S7004 to step S7007 until the elapsed time after switching to the distribution target region of interest exceeds the set time period that is set for the distribution target region of interest.

In step S7005, the system control unit 1003 determines whether or not the elapsed time since the last transmission of a frame has reached the frame interval obtained in step S7001 for the distribution target region of interest. As a result of this determination, if the elapsed time since the last transmission of the frame has reached the frame interval obtained in step S7001 for the distribution target region of interest, the processing proceeds to step S7006. In contrast, if the elapsed time since the last transmission of the frame has not reached the frame interval obtained in step S7001 for the distribution target region of interest, the processing repeats the determination of step S7005 again. In step S7006, the system control unit 1003 distributes one frame of video corresponding to the distribution target region of interest. In step S7008, the system control unit 1003 switches to (selects) the next distribution target region in the distribution order from the distribution target region of interest.

Figure 7:
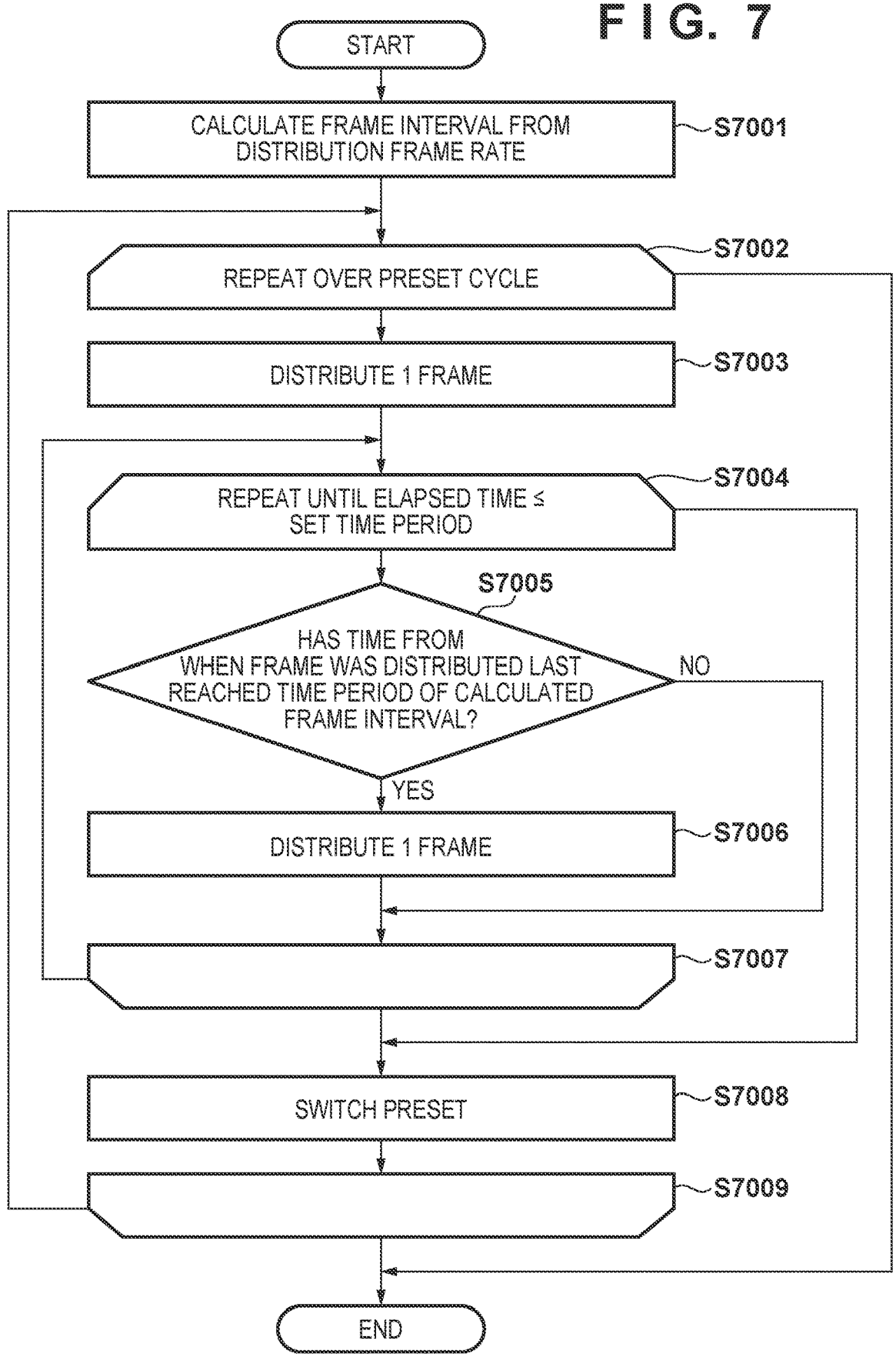
FIG. 7 is a flowchart of processing performed by the monitoring camera 1000.
Figure 9:
FIG. 9 is a diagram illustrating an example of frame intervals of video corresponding to distribution target regions, in accordance with processing according to the flowchart of FIG. 7.

An example of a frame interval for video corresponding to each distribution target region in accordance with the processing according to the flowchart of FIG. 7 will be described with reference to FIG. 9. The upper part of FIG. 9 illustrates the set time period and the frame interval of each distribution target region before the processing according to the flowchart of FIG. 7 is performed, and the lower part of FIG. 9 illustrates the set time period and the frame interval of each distribution target region after the processing according to the flowchart of FIG. 7 is performed. In FIG. 9, the definitions of "number", "set time period [s]", and "frame interval [s]" are similar to those in FIG. 5.

Here, the set time periods (5, 4, 6 respectively) of the distribution target region corresponding to where "number" is 2, 3, and 5 are greater than or equal to 4, which is the frame interval. However, the set time periods (respectively 2 and 1) of the distribution target region corresponding to where "number" is 1 and 4 are less than 4, which is the frame interval. In this case, in the flowchart of FIG. 7, for the distribution target region corresponding to the "number" of 1, one frame is distributed when the elapsed time from the switching to the distribution target region has reached the set time period of 2. Therefore, as illustrated in the lower part of FIG. 9, the frame interval 4 of the distribution target region becomes 2, which is the set time period, and as a result, the distribution frame rate becomes 0.5 fps, which is the inverse thereof. Similarly, in the flowchart of FIG. 7, for the distribution target region corresponding to the "number" of 4, one frame is distributed when the elapsed time from the switching to the distribution target region has reached the set time period of 1. Therefore, as illustrated in the lower part of FIG. 9, the frame interval 4 of the distribution target region becomes 1, which is the set time period, and as a result, the distribution frame rate becomes 1 fps, which is the inverse thereof.

As described above, according to the present embodiment, since at least one frame is distributed for all distribution target regions which are targets of the preset cycle function, it is possible to distribute video corresponding to all distribution target regions which are targets of the preset cycle function.

The method of adjusting the frame interval corresponding to the distribution target region, that is, the method of controlling the distribution frame rate of the distribution target region is not limited to the above method. For example, when the frame interval corresponding to the distribution target region having the shortest set time period out of all the distribution target regions that are targets of the preset cycle function is longer than the shortest set time period, the distribution frame rate of all the distribution target regions may be changed to the inverse of the shortest set time period.

Further, in the present embodiment, one frame is distributed immediately after switching of the distribution target region, and thereafter, video distribution is performed in accordance with the distribution frame rate in consideration of the elapsed time, but there is no limitation to this. For example, configuration may be taken to add processing for distributing one frame immediately after the switching of the distribution target region, independently of the video distribution set at the distribution frame rate.

Third Embodiment

In the present embodiment, in a case of setting one of the distribution frame rate and the set time period, if there is no correspondence to a combination of a distribution frame rate and a set time period so that the video corresponding to all distribution target regions that are targets of the preset cycle function can be distributed, a warning is notified.

Figure 10:
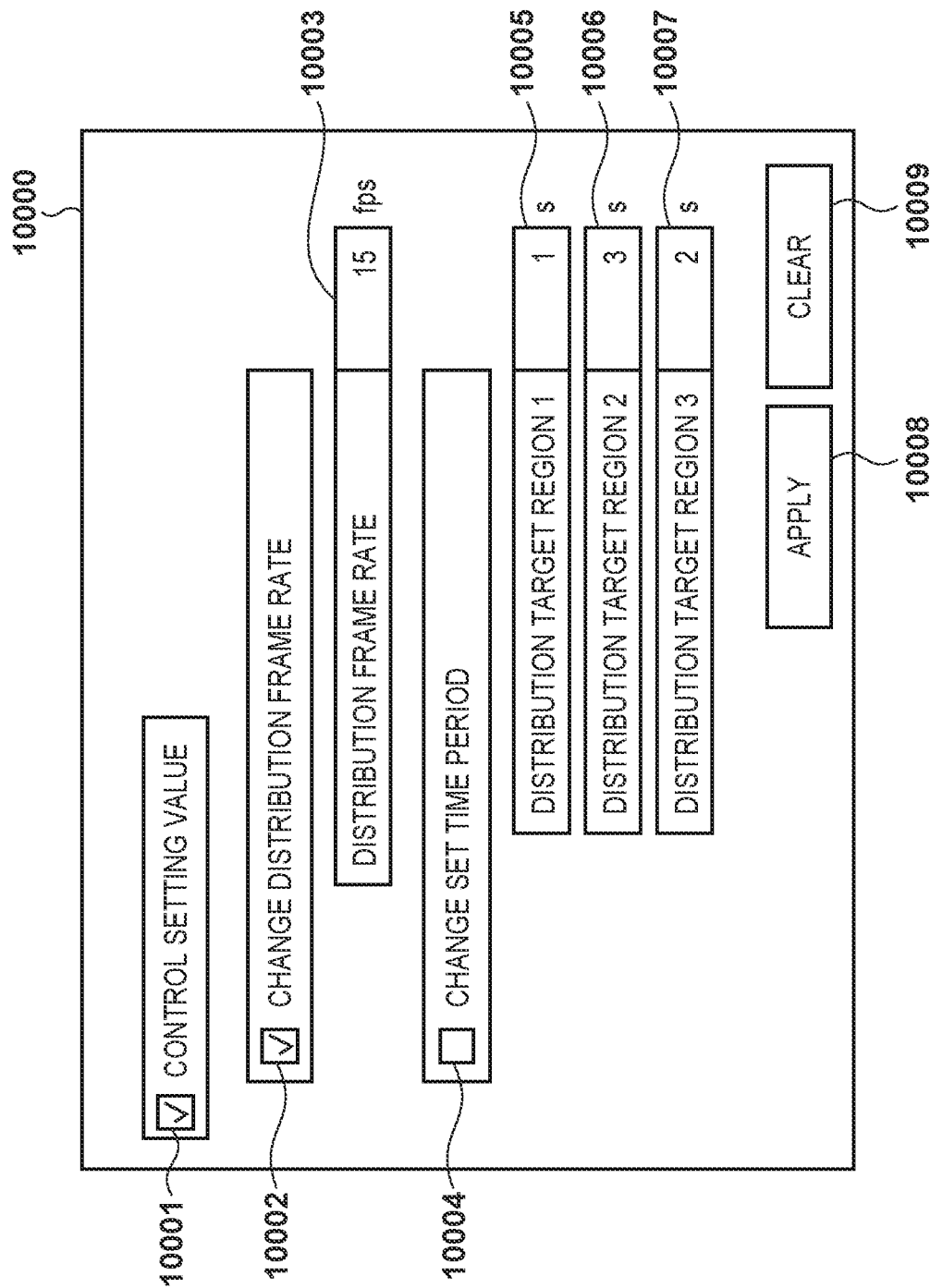
FIG. 10 is a diagram illustrating a configuration example of a GUI.

In the present embodiment, the distribution frame rate and the set time period can be set using the GUI illustrated in FIG. 10. The GUI 10000 of FIG. 10 is an example of a setting page GUI for a preset cycle function of the setting page of the monitoring camera 1000, for example, and is displayed on the display unit 2001.

When the user operates the input unit 2002 to turn on the check box 10001, the check boxes 10002 and 10004 enter an operable state, and it is possible to perform an operation to turn on only one of the check boxes 10002 and 10004.

A state is entered where it is possible to input numerical value to a region 10003 only when the user operates the input unit 2002 to turn on the check box 10002. The region 10003 is a region for inputting the distribution frame rate of each distribution target region, and the user can input a distribution frame rate to the region 10003 by operating the input unit 2002. In the region 10003, the initial value of the distribution frame rate or the distribution frame rate input last time is displayed. When the check box 10002 is turned on, the check box 10004 is turned off.

In contrast, when the user operates the input unit 2002 to turn on the check box 10004, a state is entered in which it is possible to input numerical values to regions 10005 to 10007 respectively corresponding to the distribution target regions where "number" is 1 to 3. Regions 10005 to 10007 are regions for inputting the set time period of the distribution target regions for which "number" is 1 to 3, respectively, and the user can input the set time period of the distribution target regions corresponding to the region 10005 to 10007 by operating the input unit 2002. In the regions 10005 to 10007, the initial value of the set time period or the previously input set time period is displayed. When the check box 10004 is turned on, the check box 10002 is turned off.

When the user operates the input unit 2002 to instruct a button 10008, the system control unit 2003 generates setting information indicating the contents (distribution frame rate and set time period) set in the GUI of FIG. 10. Then, the system control unit 2003 transmits the generated setting information to the monitoring camera 1000 via the communication unit 2004. The system control unit 1003 of the monitoring camera 1000 stores the setting information transmitted from the client apparatus 2000 in the storage unit 1004. In contrast, when the user operates the input unit 2002 to instruct the button 10009, the content set in the GUI of FIG. 10 returns to the content before any change.

Processing performed by the system control unit 2003 when the button 10008 is instructed by the user in a state where the check box 10002 is on will be described with reference to the flowchart of FIG. 11A.

In step S11001, the system control unit 2003 obtains the distribution frame rate inputted to the region 10003. In step S11002, the system control unit 2003 obtains the inverse of the distribution frame rate obtained in step S11001 as the frame interval.

Then, in step S11003, the system control unit 2003 obtains the set time periods of the distribution target regions (the set time periods inputted to the regions 10005 to 10007 in the example of FIG. 10). Then, the system control unit 2003 determines whether or not, among the set time periods of the distribution target regions, there is a set time period that is less than the frame interval obtained in step S11002. As a result of this determination, when there is a set time period less than the frame interval obtained in step S11002 among the set time periods of the distribution target regions, the process proceeds to step S11004. On the other hand, when there is no set time period that is less than the frame interval obtained in step S11002 among the set time periods of the distribution target regions, the process according to the flow chart of FIG. 11A ends.

In step S11004, the system control unit 2003 makes a notification of a warning. A method of notifying the warning is not limited to a specific notification method. For example, the system control unit 2003 may display an image or text representing a warning on the display screen of the display unit 2001, or may notify the warning by sound when the client apparatus 2000 has a configuration for generating a sound.

In step S11005, in order to set the distribution frame rate obtained in step S11001 as the distribution frame rate at the time of actually distributing video, the system control unit 2003 generates setting information indicating the content set in the GUI of FIG. 10. Then, the system control unit 2003 transmits the generated setting information to the monitoring camera 1000 via the communication unit 2004. The system control unit 1003 of the monitoring camera 1000 receives the setting information, and stores the received setting information in the storage unit 1004.

Figure 11A:
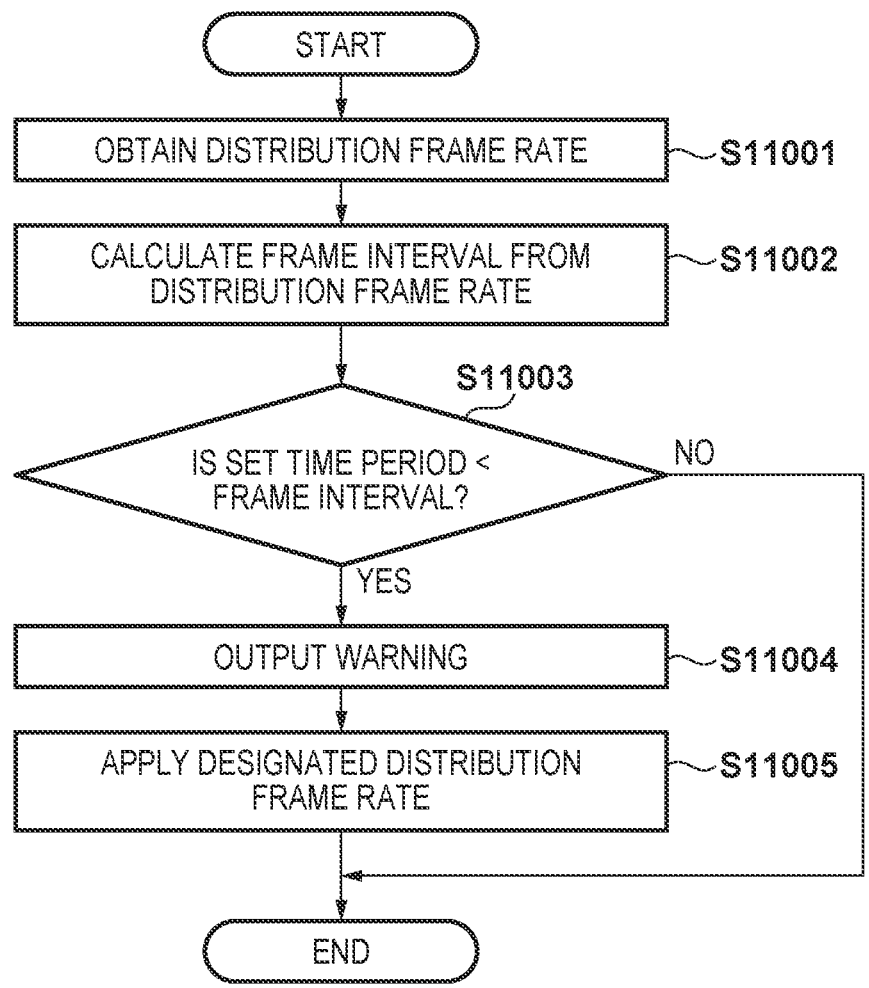
FIGS. 11A and 11B are flowcharts of processing performed by the system control unit 2003.

As described above, in the process according to the flow chart of FIG. 11A, even if the set time period is less than the frame interval obtained in step S11002, the distribution frame rate obtained in step S11001 is set after the notification of the warning. In addition to or instead of issuing a warning, in the client apparatus 2000 or the monitoring camera 1000, the distribution frame rate may be controlled based on the set time period as in the second embodiment.

Figure 11B:
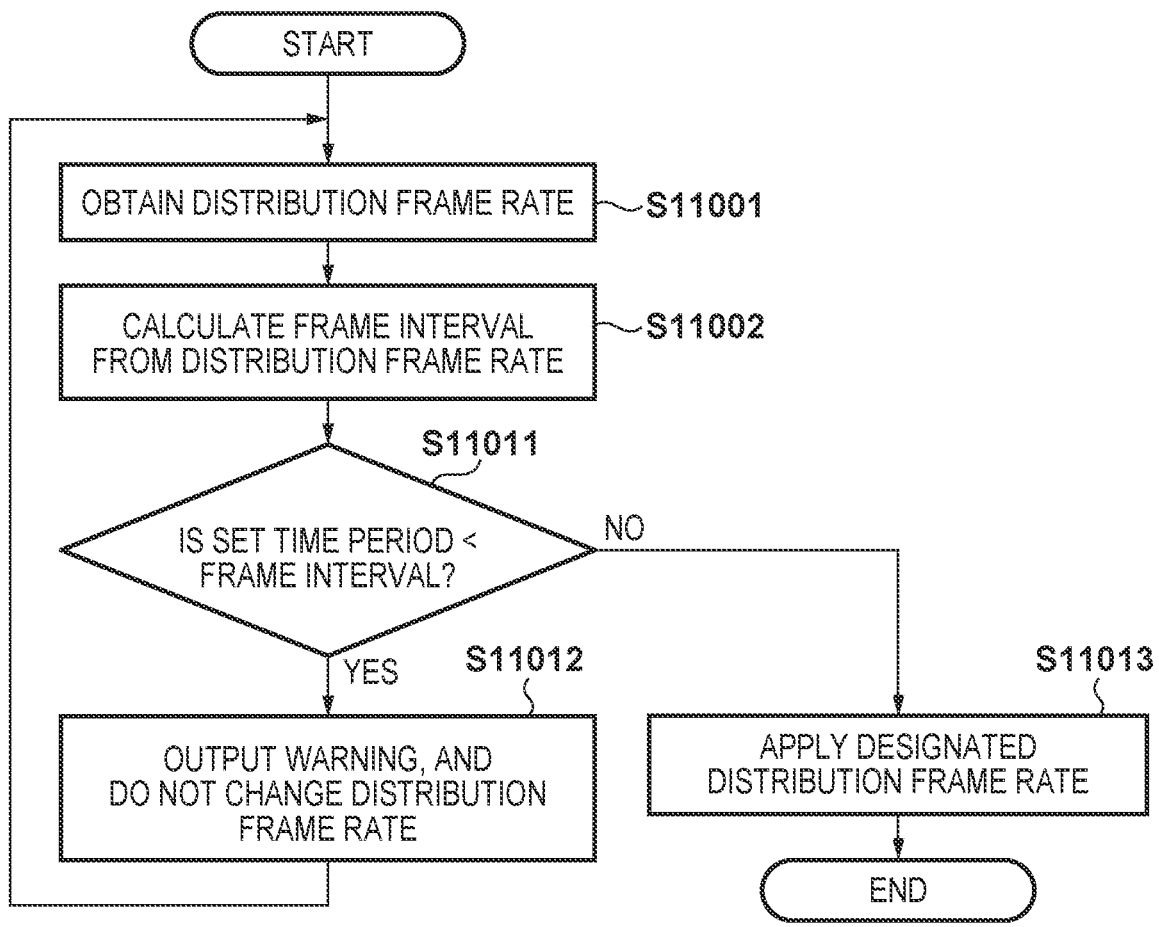

Configuration may be taken such that, when there is a set time period that is less than the frame interval obtained in step S11002, the distribution frame rate obtained in step S11001 is not set after the notification of the warning. The processing corresponding to such a case will be described with reference to the flowchart of FIG. 11B. In FIG. 11B, the same processing steps as those in FIG. 11A are denoted by the same step numbers, and a description of these processing steps is omitted. Processing according to the flowchart of FIG. 11B is performed by the system control unit 2003 when the button 10008 is instructed by the user in a state where the check box 10002 has been turned on.

Then, in step S11011, the system control unit 2003 obtains the set time periods of the distribution target regions (the set time periods inputted to the regions 10005 to 10007 in the example of FIG. 10). Then, the system control unit 2003 determines whether or not, among the set time periods of the distribution target regions, there is a set time period that is less than the frame interval obtained in step S11002. As a result of this determination, when there is a set time period less than the frame interval obtained in step S11002 among the set time periods of the distribution target regions, the process proceeds to step S11012. In contrast, when there is no set time period that is less than the frame interval obtained in step S11002 among the set time periods of the distribution target regions, the process proceeds to step S11013.

In step S11012, the system control unit 2003 makes a notification of a warning in the same manner as in step S11004 described above, and does not perform generation of setting information and transmission of setting information to the monitoring camera 1000 (in other words, the processing of step S11005 described above). That is, the distribution frame rate and the set time period currently set in the monitoring camera 1000 are not changed. Configuration may be taken to, in this step, make it so that an instruction cannot be made by disabling the button 10008.

Meanwhile, in step S11013, the system control unit 2003 generates setting information indicating content set in the GUI of FIG. 10, and transmits the generated setting information to the monitoring camera 1000 via the communication unit 2004. The monitoring camera 1000 stores the setting information in the storage unit 1004.

For the warning performed in step S11004 and step S11012 described above, for example, the warning text "Since the set time period is short, there is a distribution target region for which it is possible that video will not be distributed." may be displayed on the display unit 2001. Additionally or alternatively, for example, when the distribution frame rate is 0.5 fps, the frame interval is 2 seconds, a range of specific values may be displayed on a display screen of the display unit 2001, as with "Please set the set time period to 2 seconds or more."

Next, processing performed by the system control unit 2003 when the button 10008 is instructed by the user in a state where the check box 10004 is on will be described with reference to the flowchart of FIG. 12A.

Then, in step S12001, the system control unit 2003 obtains the set time periods of the distribution target regions (the set time periods inputted to the regions 10005 to 10007 in the example of FIG. 10).

In step S12002, the system control unit 2003 obtains the distribution frame rate (in the example of FIG. 10, the distribution frame rate inputted to the region 10003). Then, the system control unit 2003 obtains the inverse of the obtained distribution frame rate as the frame interval.

Then, in step S12003, the system control unit 2003 determines whether or not, among the set time periods of the distribution target regions, there is a set time period that is less than the frame interval obtained in step S12002. As a result of this determination, when there is a set time period less than the frame interval obtained in step S12002 among the set time periods of the distribution target regions, the process proceeds to step S12004. On the other hand, when there is no set time period that is less than the frame interval obtained in step S12002 among the set time periods of the distribution target regions, the process according to the flow chart of FIG. 12A ends.

In step S12004, the system control unit 2003 makes a notification of a warning. A method of notifying a warning is not limited to a particular notification method as in step S11004 described above. In step S11005, in order to apply the set time period of the distribution target region obtained in step S12001, the system control unit 2003 generates setting information indicating the content set in the GUI of FIG. 10, and transmits the setting information to the monitoring camera 1000 via the communication unit 2004. The system control unit 1003 of the monitoring camera 1000 receives the setting information, and stores the received setting information in the storage unit 1004.

Figure 12A:
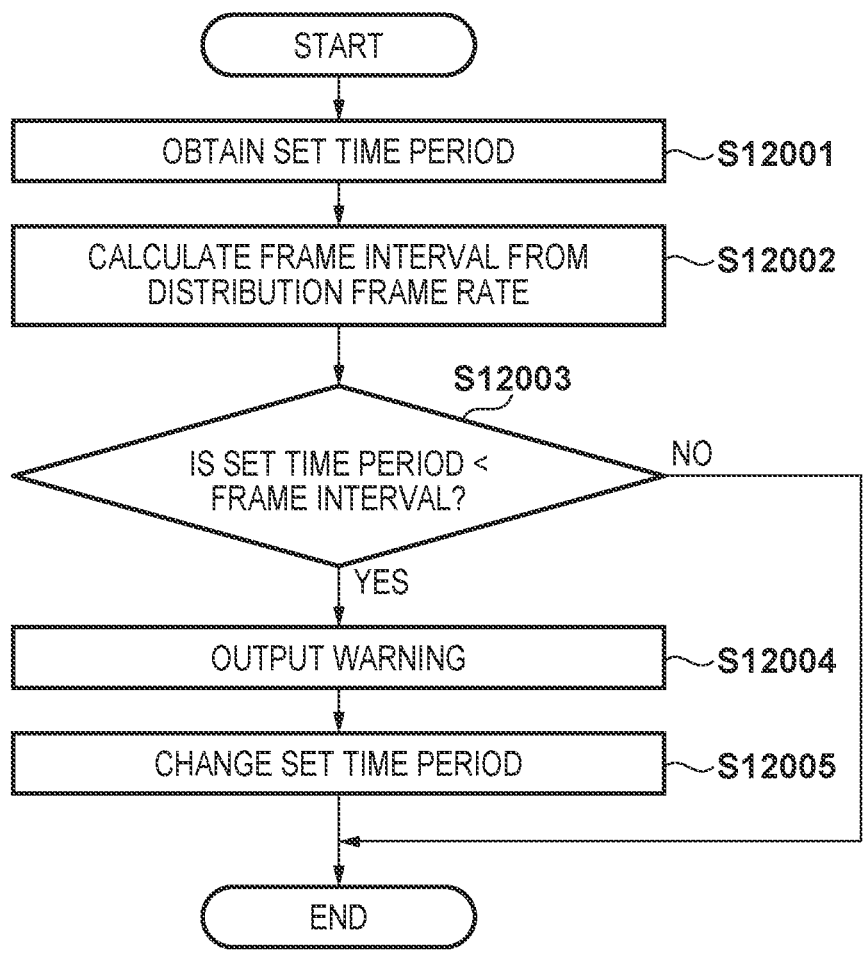
FIGS. 12A and 12B are flowcharts of processing performed by the system control unit 2003.

As described above, in the process according to the flow chart of FIG. 12A, even if there is a set time period less than the frame interval obtained in step S12002 among the set time periods of the distribution target regions, the set time period obtained in step S12001 is set after the notification of the warning. Note that, in addition to or instead of issuing a warning, in the client apparatus 2000 or the monitoring camera 1000, the distribution frame rate may be controlled based on the set time period as in the first embodiment.

Figure 12B:
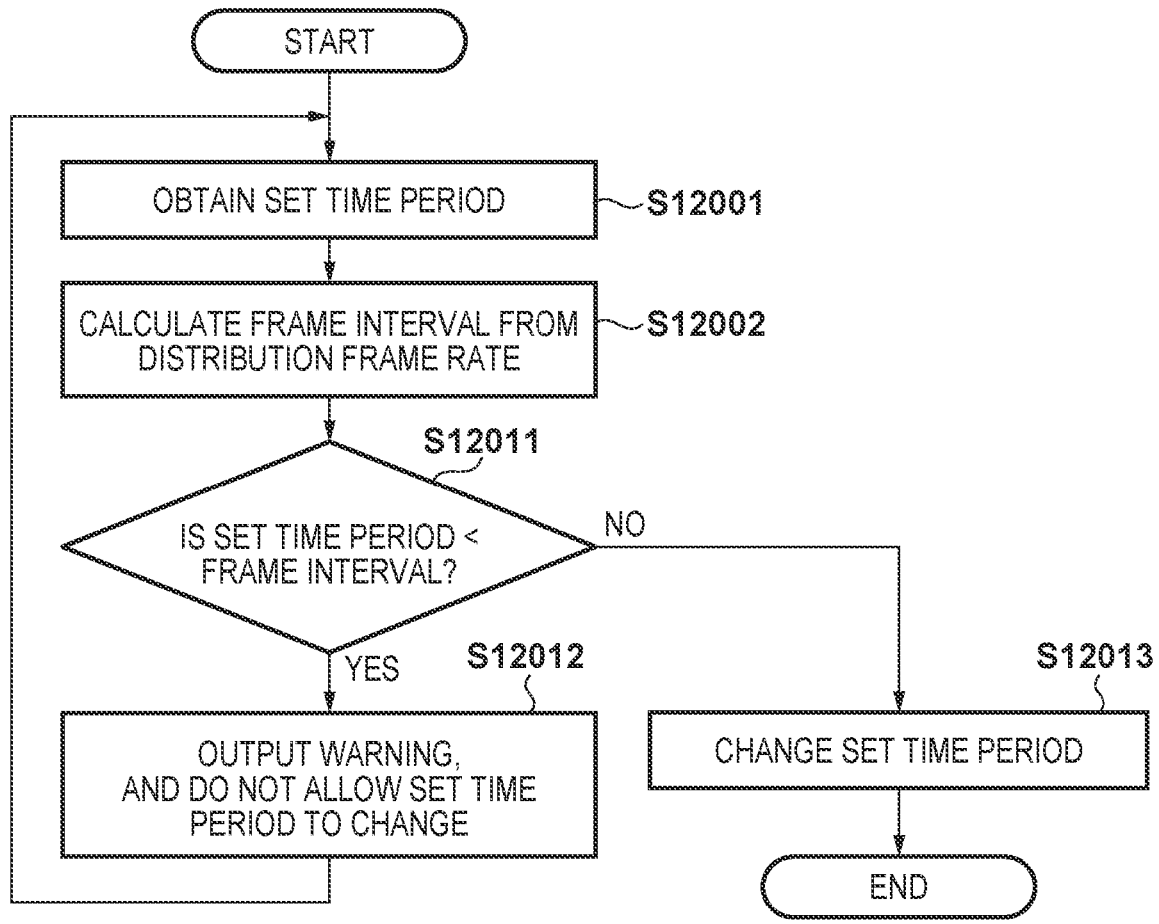

Note that configuration may be taken to, when there is a set time period that is less than the frame interval obtained in step S12002 among the set time periods of the distribution target regions, not set the set time period obtained in step S12001 after the notification of the warning. The processing corresponding to such a case will be described with reference to the flowchart of FIG. 12B. In FIG. 12B, the same processing steps as those in FIG. 12A are denoted by the same step numbers, and a description of these processing steps is omitted. Processing according to the flowchart of FIG. 12B is performed by the system control unit 2003 when the button 10008 is instructed by the user in a state where the check box 10004 has been turned on.

Then, in step S12011, the system control unit 2003 determines whether or not, among the set time periods of the distribution target regions, there is a set time period that is less than the frame interval obtained in step S12002. As a result of this determination, when there is a set time period less than the frame interval obtained in step S12002 among the set time periods of the distribution target regions, the process proceeds to step S12012. In contrast, when there is no set time period that is less than the frame interval obtained in step S12002 among the set time periods of the distribution target regions, the process proceeds to step S12013.

In step S12012, the system control unit 2003 makes a notification of a warning in the same manner as in step S12004 described above, and does not perform generation of setting information and transmission of setting information to the monitoring camera 1000. That is, the distribution frame rate and the set time period currently set in the monitoring camera 1000 are not changed. Configuration may be taken to, in this step, make it so that an instruction cannot be made by disabling the button 10008.

Meanwhile, in step S12013, the system control unit 2003 generates setting information indicating content set in the GUI of FIG. 10, and transmits the generated setting information to the monitoring camera 1000 via the communication unit 2004. The monitoring camera 1000 stores the setting information in the storage unit 1004.

Note that, for the warning performed in step S12004 and step S12012 described above, for example, the warning text "Since the set time period is short, there is a distribution target region for which it is possible that video will not be distributed." may be displayed on the display unit 2001. In addition to or instead of this, if there is a distribution target region with a set time period of 2 seconds, a specific range for a value may be displayed on the display screen of the display unit 2001, as with "Please set the distribution frame rate to 0.5 fps or more." As described above, according to the present embodiment, it is possible to notify the user that there is a distribution target region that has the possibility of not being distributed.

A method of controlling one of the distribution frame rate and the set time period the other in accordance with is not limited to the above method using the GUI of FIG. 10. For example, the system control unit 2003 may determine which of the distribution frame rate and the set time period is to be controlled based on one of the distribution frame rate and the set time period. For example, when a video recording function of the monitoring camera 1000 is enabled, the system control unit 2003 may control the set time period based on the distribution frame rate, as in the first embodiment.

Fourth Embodiment

A video distribution destination is not limited to the client apparatus 2000, and the monitoring camera 1000 may distribute video to another other device instead of or in addition to the client apparatus 2000.

Also, the monitoring camera 1000 and the client apparatus 2000 may be integrated to form a single device, in which case the integrated device executes the respective operations of the monitoring camera 1000 and the client apparatus 2000.

Part of the operation of one apparatus out of the monitoring camera 1000 and the client apparatus 2000 may be performed by the other apparatus, and processing performed by each of the monitoring camera 1000 and the client apparatus 2000 is not limited to the above example.

Fifth Embodiment

Figure 13:
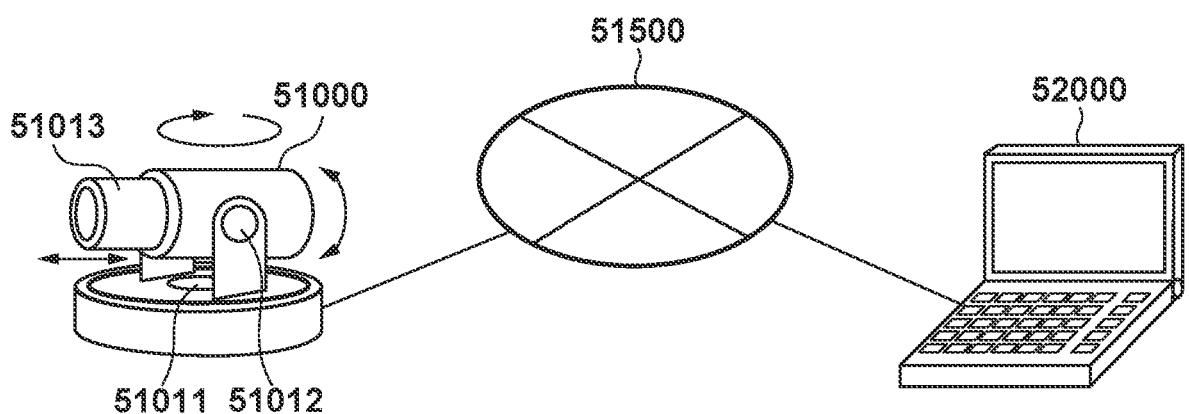
FIG. 13 is a diagram illustrating an example of an appearance of a network camera system.

First, a network camera system according to the present embodiment will be described with reference to FIG. 13, which illustrates an example of an appearance of the system. As illustrated in FIG. 13, the network camera system according to the present embodiment has a monitoring camera 51000 and a client apparatus 52000. The monitoring camera 51000 and the client apparatus 52000 are connected to a wired and/or wireless network 51500, and are configured to be able to communicate data with each other via the network 51500.

The monitoring camera 51000 has a pan drive mechanism 51011, a tilt drive mechanism 51012, and a zoom drive mechanism 51013, and these drive mechanisms operate in accordance with instructions from the client apparatus 52000. The pan drive mechanism 51011 is a drive mechanism for changing the capturing direction of the monitoring camera 51000 in the pan direction. The tilt drive mechanism 51012 is a drive mechanism for changing the capturing direction of the monitoring camera 51000 in the tilt direction. The zoom drive mechanism 51013 is a drive mechanism for changing an angle of view of the monitoring camera 51000.

The client apparatus 52000 is a computer device such as a personal computer (PC), a tablet terminal device, or a smart phone, and performs various settings and instructions with respect to an image capturing apparatus 5101, and receives a captured image outputted from the image capturing apparatus 5101.

Figure 14:
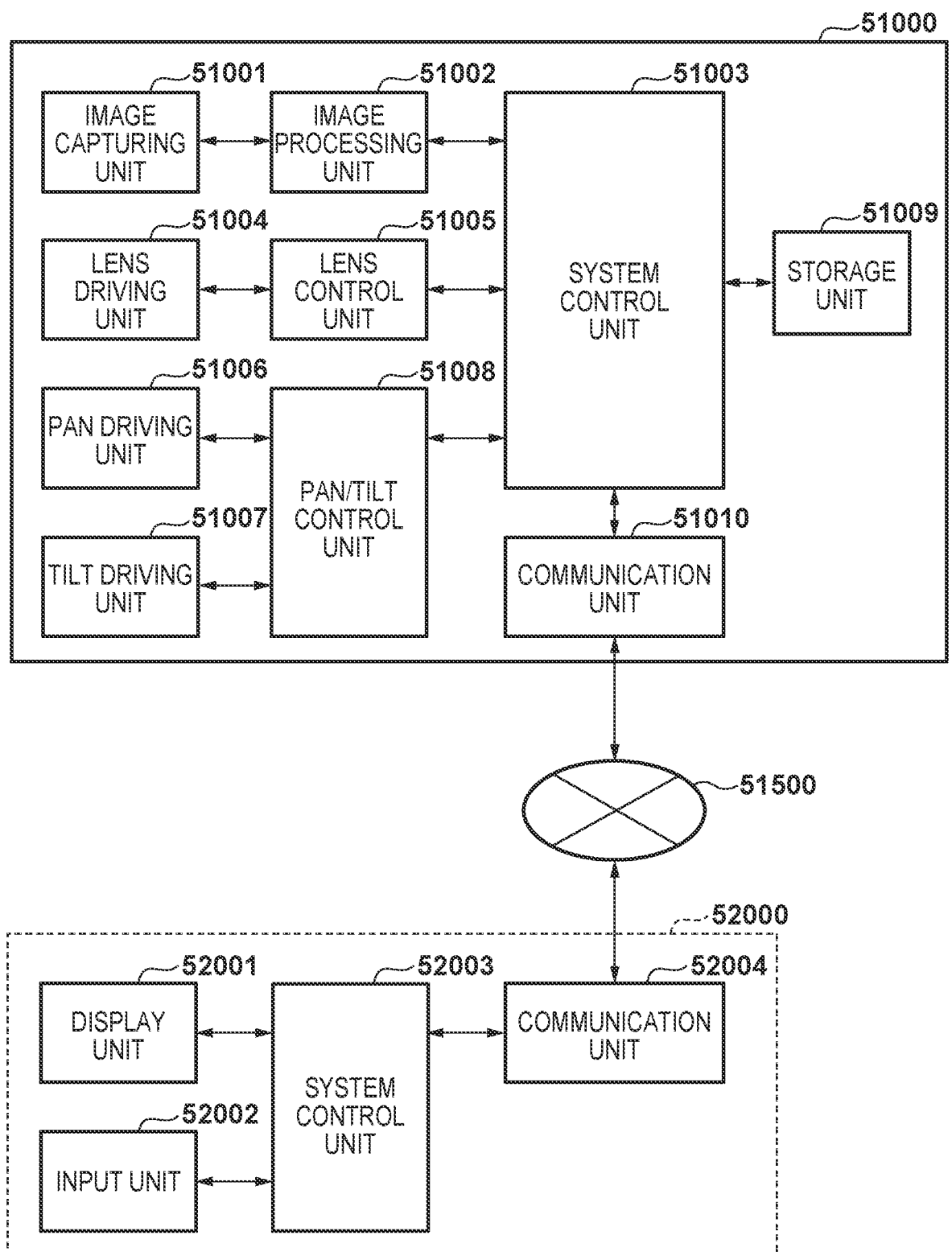
FIG. 14 is a block diagram illustrating an example of a functional configuration of each of a monitoring camera 51000 and a client apparatus 52000.

An example of a functional configuration of each of the monitoring camera 51000 and the client apparatus 52000 will be described with reference to the block diagram of FIG. 14. First, an example of the functional configuration of the monitoring camera 51000 will be described.

The image capturing unit 51001 has an image capturing element and a lens group (optical system) that includes a focus lens and a zoom lens. Light from the external world is received by the image capturing element via an optical system, and an image signal corresponding to the received light is outputted from the image capturing element.

An image processing unit 51002 performs various types of image processing on an image signal from the image capturing unit 51001 to generate and output an image signal (a captured image) that has been subjected to image processing. The image processing unit 51002 may compress and encode the generated captured image before outputting it.

The lens driving unit 51004 has a driving system of the lens group included in the image capturing unit 51001 and a motor that is a driving source of the driving system, and controls the focal length and zooming of the image capturing unit 51001 by driving the motor and controlling the driving system. The operation of the lens driving unit 51004 is controlled by a lens control unit 51005. The lens control unit 51005 controls the operation of the lens driving unit 51004 in accordance with an instruction from a system control unit 51003.

A pan driving unit 51006 has a mechanical driving system for performing a pan operation of the image capturing unit 51001 and a motor that is a driving source of the mechanical driving system, and controls the pan angle the image capturing unit 51001 by driving the motor and controlling the mechanical driving system. The operation of the pan driving unit 51006 is controlled by a pan/tilt control unit 51008.

A tilt driving unit 51007 has a mechanical driving system for performing a tilt operation of the image capturing unit 51001 and a motor that is a driving source of the mechanical driving system, and controls the tilt angle the image capturing unit 51001 by driving the motor and controlling the mechanical driving system. The operation of the tilt driving unit 51007 is controlled by the pan/tilt control unit 51008. The pan/tilt control unit 51008 controls the operation of the pan driving unit 51006 or the tilt driving unit 51007 in accordance with an instruction from a system control unit 51003.

A storage unit 51009 stores information groups necessary for the operation of the monitoring camera 51000, such as various types of information transmitted from the client apparatus 52000 and other information calculated from the various types of information. Details of information recorded in the storage unit 51009 will be described later.

A system control unit 51003 has one or more processors and a memory. The processor executes processing using a computer program and data stored in the memory to control the operation of the entire monitoring camera 51000, and executes or controls various processing described later as being performed by the monitoring camera 51000.

When the system control unit 51003 receives a camera control command from the client apparatus 52000, the system control unit 51003 performs processing according to the camera control command. For example, when the system control unit 51003 receives an instruction to change the zoom or the focal length as a camera control command, the system control unit 51003 instructs the lens control unit 51005 to change the zoom or the focal length in accordance with the instruction. In addition, for example, when the system control unit 51003 receives an instruction to change the pan angle as a camera control command, the system control unit 51003 instructs the pan/tilt control unit 51008 to change the pan angle in accordance with the instruction. In addition, for example, when the system control unit 51003 receives an instruction to change the tilt angle as a camera control command, the system control unit 51003 instructs the pan/tilt control unit 51008 to change the tilt angle in accordance with the instruction.

The system control unit 51003 reads and writes information from and to the storage unit 51009, and distributes a captured image obtained by the image processing unit 51002 to the client apparatus 52000. A communication unit 51010 is an interface for performing data communication with the client apparatus 52000 via the network 51500.

Next, the client apparatus 52000 will be described. A display unit 52001 is configured by a liquid crystal screen, a touch panel screen, or the like, and can display a result of processing by a system control unit 52003 in accordance with an image, characters, or the like. The display unit 52001 displays, for example, a captured image received from the monitoring camera 51000, a graphical user interface (GUI) described below, and the like.

An input unit 52002 is a user interface such as a keyboard, a mouse, and a touch panel screen, and by being operated by a user, it is possible to input various instructions and information to the client apparatus 52000.

A system control unit 52003 has one or more processors and a memory. The processor executes processing using a computer program and data stored in the memory to control the operation of the entire client apparatus 52000, and executes or controls various processing described later as being performed by the client apparatus 52000. A communication unit 52004 is an interface for performing data communication with the monitoring camera 51000 via the network 51500.

Figures 15, 16:
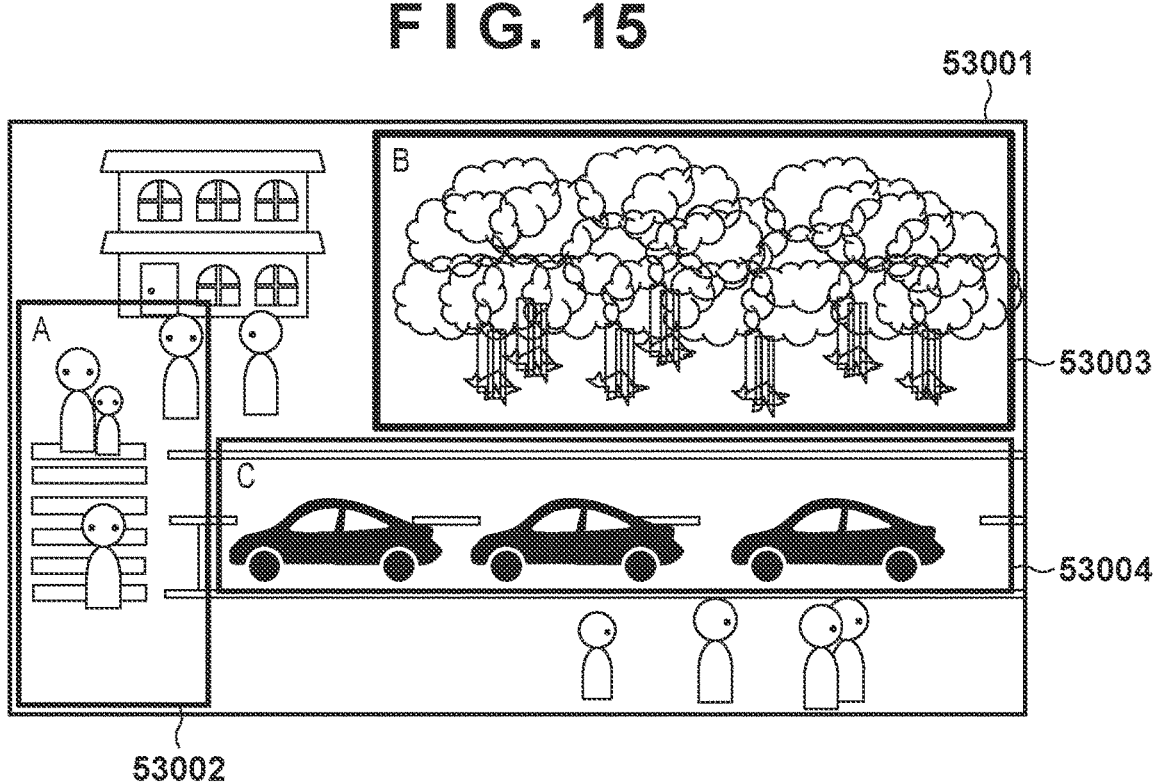
FIG. 15 is a diagram illustrating an example of respective image regions (distribution target regions).
FIG. 16 is a diagram illustrating a configuration example of a GUI.

Next, FIG. 15 illustrates an example of each image region (distribution target region) set as a distribution target image region in a captured image in accordance with the monitoring camera 51000. A captured image 53001 is obtained by the monitoring camera 51000 capturing a wide range, and an image region 53002 (image region name: A), an image region 53003 (image region name: B), and an image region 53004 (image region name: C) are set on the captured image 53001. For example, the monitoring camera 51000 distributes video (captured images of a plurality of frames) corresponding to the image region 53002 to the client apparatus 52000 at a prescribed distribution frame rate for a predetermined amount of time, and then switches the distribution target image region from the image region 53002 to the image region 53003. For example, the monitoring camera 51000 distributes video (captured images of a plurality of frames) corresponding to the image region 53003 to the client apparatus 52000 at a prescribed distribution frame rate for a predetermined amount of time. The monitoring camera 51000 distributes video (captured image of a plurality of frames) corresponding to the image region 53003 to the client apparatus 52000 for a predetermined amount of time, and then switches the distribution target image region from the image region 53003 to the image region 53004. The monitoring camera 51000 then distributes video (captured images of a plurality of frames) corresponding to the image region 53004 to the client apparatus 52000 at a prescribed distribution frame rate for a predetermined amount of time. In this manner, video (captured images of a plurality of frames) corresponding to the image regions 53002, 53003, and 53004 are distributed repeatedly in this order.

Note that there are various methods for distributing the video corresponding to an image region of interest (image regions 53002, 53003, and 53004), and there is no limitation to a specific method. For example, the monitoring camera 51000 may control the panning, tilting, and zooming of the monitoring camera 51000 to capture an image region of interest as a capturing region, and distribute video obtained by the capturing as a "video corresponding to the image region of interest". Further, for example, the monitoring camera 51000 may capture an entirety including the image region of interest (the captured image 53001 in the case of FIG. 15), then cut out the image region of interest from the entirety, and distribute video within the image region of interest as "video corresponding to the image region of interest".

FIG. 16 illustrates an example of the configuration of a GUI for setting the video distribution frame rate corresponding to each of the image regions 53002, 53003, and 53004. The GUI 54001 of FIG. 16 is an example of a GUI of a setting page for setting the distribution frame rate for each image region when the preset cycle function of the setting page of the monitoring camera 51000 is set, for example. Hereinafter, display control of the GUI 54001 and processing executed in response to a user operation on the GUI 54001 are all performed by the system control unit 52003.

In the GUI 54001 of FIG. 16, "number" is a number unique to each of the image region 53002, 53003, and 53004, and is, for example, a number representing a distribution order. The "image region name" is an image region name of each of the image region 53002, 53003, and 53004.

The "still time period (seconds)" is a time period for distributing video corresponding to each of the image regions 53002, 53003, and 53004. The "still time period (seconds)" corresponding to each of the image region 53002, 53003, and 53004 is registered in the storage unit 51009. When the GUI 54001 is displayed, the system control unit 52003 obtains "still time period (seconds)" corresponding to each of the image region 53002, 53003, and 53004 from the storage unit 51009 via the communication unit 52004, and displays the obtained "still time period (second)" at the corresponding portion of the GUI 54001. In the example of FIG. 16, the "still time period (sec)" for the image region 53002 is "10 (sec)", the "still time period (sec)" for the image region 53003 is "5 (sec)", and the "still time period (sec)" for the image region 53004 is "10 (sec)". In the case of such a setting, the monitoring camera 51000 repeats the cycle of "distributing video corresponding to the image region 53002 for 10 seconds→distributing video corresponding to the image region 53003 for 5 seconds→distributing video corresponding to the image region 53004 for 10 seconds".

The "frame rate (fps)" is a distribution frame rate of video corresponding to each of the image regions 53002, 53003, and 53004. The "frame rate (fps)" corresponding to each of the image region 53002, 53003, and 53004 is registered in the storage unit 51009. When the GUI 54001 is displayed, the system control unit 52003 obtains "frame rate (fps)" corresponding to each of the image region 53002, 53003, and 53004 from the storage unit 51009 via the communication unit 52004, and displays the obtained "frame rate (fps)" at the corresponding portion of the GUI 54001. Initial values are set for the "frame rates (fps)" of the image regions 53002, 53003, and 53004 that are initially registered in the storage unit 51009, and these are updated as appropriate by processing described later. In the example of FIG. 16, the "frame rate (fps)" for the image region 53002 is "15 (fps)", and the "frame rate (fps)" for the image region 53003 is "10 (fps)". The "frame rate (fps)" for the image region 53004 is "30 (fps)". In the case of such a setting, the monitoring camera 51000 repeats the cycle of "distributing video corresponding to the image region 53002 at 15 (fps)→distributing video corresponding to the image region 53003 at 10 (fps)→distributing video corresponding to the image region 53004 at 30 (fps)".

In the present embodiment, as illustrated in FIG. 15, for example, "15 fps" is set as the "frame rate (fps)" for a region of a crosswalk where there is a high possibility of relatively large human movement, as with the image region 53002. As illustrated in FIG. 15, a distribution frame rate lower than that of the image region 53002, for example, "10 fps" is set as the "frame rate (fps)" for a region of a forest, as with the image region 53003, which has relatively little movement compared to the image region 53002. As illustrated in FIG. 15, a distribution frame rate higher than that of the image region 53002, for example, "30 fps" is set as a "frame rate (fps)" for a region of a road through which an automobile having a high speed passes, as with the image region 53004.

The "amount of motion" is an amount of motion of a video measured in advance in each of the image regions 53002, 53003, and 53004 (in the distribution target region), and in FIG. 16, the amount of motion is displayed by an indicator. The "amount of motion" corresponding to each of the image region 53002, 53003, and 53004 is registered in the storage unit 51009. When the GUI 54001 is displayed, the system control unit 52003 obtains "amount of motion" corresponding to each of the image region 53002, 53003, and 53004 from the storage unit 51009 via the communication unit 52004, and displays the obtained "amount of motion" by an indicator at the corresponding portion of the GUI 54001. An indicator 54005 represents an amount of motion obtained in advance for the video in the image region 53002 (the longer the indicator, the larger the amount of motion). An indicator 54006 represents an amount of motion obtained in advance for the video in the image region 53003 (the longer the indicator, the larger the amount of motion). An indicator 54007 represents an amount of motion obtained in advance for the video in the image region 53004 (the longer the indicator, the larger the amount of motion).

The user can operate the input unit 52002 to instruct a row corresponding to an image region for which the distribution frame rate is to be set, out of the rows corresponding to the "numbers" of "1" to "3". In FIG. 16, an instruction has been made for a row of "number" of "2" to be a row corresponding to the image region for which the distribution frame rate is to be set, and the instructed row is subject to a highlight display.

A region 54008 is a region for inputting the "frame rate (fps)" corresponding to the instructed row, and becomes enabled (a frame rate can be input) when an instruction is made for any one of the rows corresponding to the "number" of "1" to "3".

As illustrated in FIG. 16, in a state in which an instruction for the row of "number" is "2" has been made, it is assumed that the user operates the input unit 52002 to input a desired distribution frame rate into the region 54008 and then makes an instruction with respect to the button 54009. At this time, the system control unit 52003 sets the distribution frame rate input to the region 54008 as the distribution frame rate corresponding to the image region (the image region 53003 having the image region name B) corresponding to the row (the row having the "number" of "2") for which the instruction was made. In this setting, the system control unit 52003 transmits the distribution frame rate input to the region 54008 to the monitoring camera 51000 via the communication unit 52004 as the distribution frame rate that corresponds to the image region 53003. The system control unit 51003 receives the distribution frame rate transmitted from the client apparatus 52000 via the communication unit 51010, and registers the received distribution frame rate in the storage unit 51009 as the distribution frame rate of the image region 53003. That is, in the storage unit 51009, the still time period, the latest distribution frame rate, and the amount of motion are registered for each of the image region 53002, 53003, and 53004. In addition, the system control unit 52003 displays the distribution frame rate inputted to the region 54008 at the corresponding location in the GUI 54001.

In this manner, when a user makes an instruction for a row corresponding to an image region for which the user wants to set the distribution frame rate in the GUI 54001, the user inputs the distribution frame rate in the region 54008, and then makes an instruction with respect to the button 54009 to thereby set the distribution frame rate corresponding to the image region.

In contrast, when the user operates the input unit 52002 to make an instruction with respect to the button 54010, the distribution frame rate corresponding to each image region is changed to the distribution frame rate before any change. Note that the distribution frame rate corresponding to each image region may be returned to an initial value by making an instruction with respect to the button 54010.

By setting the distribution frame rate for each image region using the GUI 54001 or the like, the following effects can be achieved. That is, when a plurality of image regions are registered as distribution targets by mechanical PTZ, digital PTZ in a wide range image, or the like, it is possible to have a high distribution frame rate for an image region with significant movement such as a road with a large amount of traffic or an intersection with many people, or an image region with a high level of interest. On the other hand, the distribution frame rate can be set low for an image region having little motion or a low level of interest. In this manner, by setting the distribution frame rate for each image region that is to be a distribution target, the amount of data and the network load can be reduced.

Figure 17:
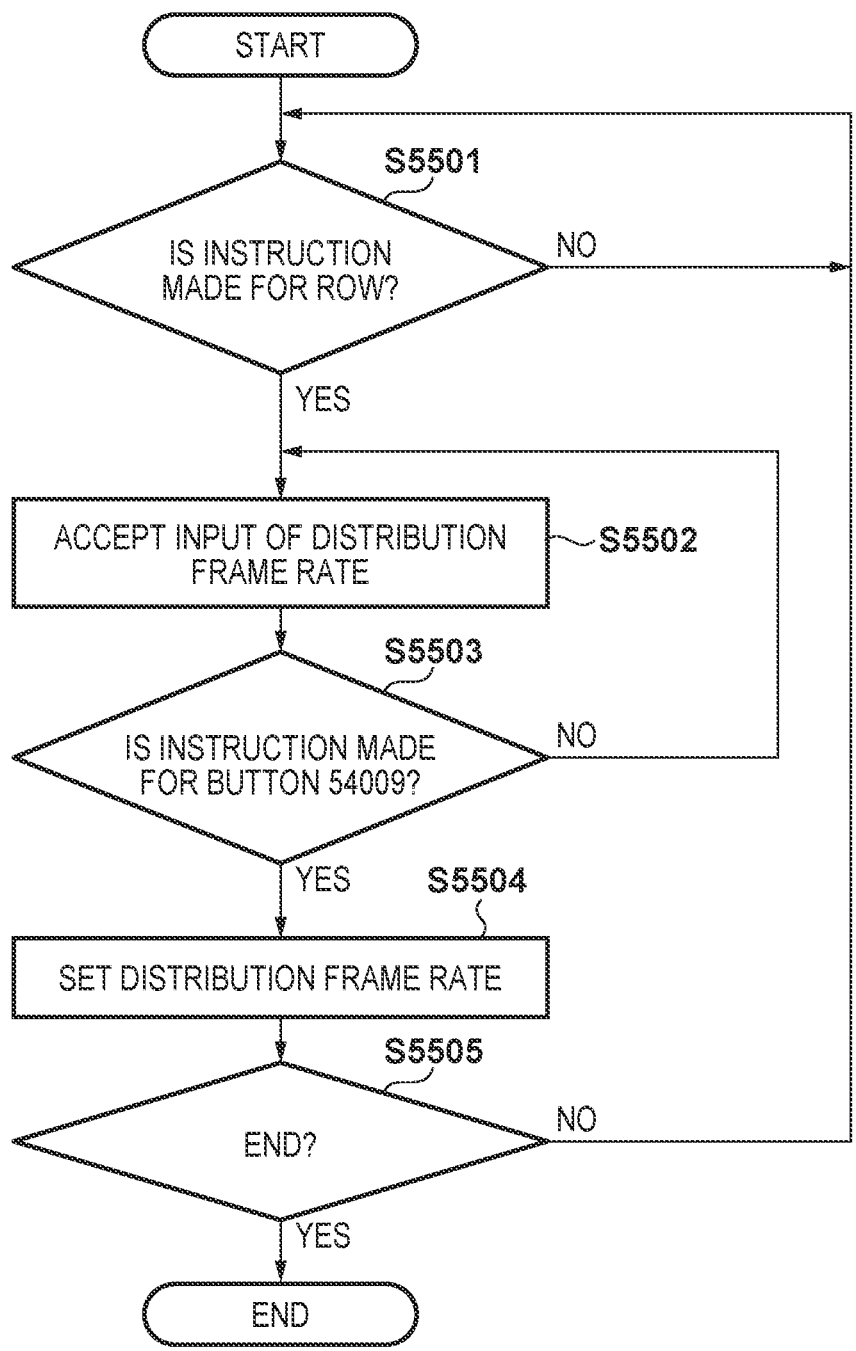
FIG. 17 is a flowchart of processing for setting a distribution frame rate.

The process of setting the distribution frame rate corresponding to the image region using the GUI 54001 of FIG. 16 will be described with reference to the flow chart of FIG. 17. At a time of starting the process according to the flow chart of FIG. 17, it is assumed that the GUI 54001 has already been displayed on the display unit 52001.

In step S5501, the system control unit 52003 determines whether or not an instruction, in accordance with a user operation of the input unit 52002, has been made with respect to any one of the rows corresponding to where "number" is "1" to "3" in the GUI 54001. As a result of this determination, if an instruction in accordance with a user operation on the input unit 52002 has been made with respect to any one of the rows corresponding to where "number" is "1" to "3", the process proceeds to step S5502. On the other hand, when no instruction has been made with respect to any of the rows corresponding to "1" to "3" of the "number", the process returns to step S5501.

In step S5502, the system control unit 52003 enables the region 54008 so that a distribution frame rate can be input to the region 54008, and accepts the input of a distribution frame rate.

In step S5503, the system control unit 52003 determines whether or not an instruction has been made with respect to button 54009. As a result of this determination, when an instruction has been made with respect to the button 54009, the process proceeds to step S5504, and when no instruction has been made with respect to the button 54009, the process returns to step S5502.

In step S5504, the system control unit 52003 updates the display of the GUI 54001 by displaying the distribution frame rate entered in the region 54008 in the "frame rate (fps)" column of the row for which the instruction has made on the GUI 54001. The system control unit 52003 transmits the distribution frame rate that was inputted to the region 54008 to the monitoring camera 51000, and causes the storage unit 51009 to register this distribution frame rate.

In step S5505, the system control unit 52003 determines whether or not a user has operated the input unit 52002 to input an instruction for ending the process of setting the distribution frame rate. As a result of this determination, if an instruction for ending the distribution frame rate setting process has been inputted, the process according to the flow chart of FIG. 17 ends, and when an instruction to end the distribution frame rate setting process has not been inputted, the process returns to step S5501.

As described above, according to the present embodiment, each distribution target region set as a distribution target image region in the captured image is individually selected, and the distribution frame rate of video corresponding to the selected distribution target region is set. As a result, it is possible to solve the conventional problem that only the same distribution frame rate can be set for all image regions, and to reduce the amount of data and the network load.

<Variation of Fifth Embodiment>

The setting of the distribution frame rate for each image region using the GUI 54001 is not limited to the setting of the preset cycle function, and may be performed at a time of a setting related to distribution for each image region.

Further, the system control unit 52003 may decide the range of the distribution frame rate that can be input to the region 54008 according to the length of the indicator corresponding to the row for which an instruction was made (if the "number" of the row for which the instruction was made is "2", the length of the indicator 54006), and notify the user of this. For example, by displaying the decided range in the vicinity of the region 54008, the system control unit 52003 can notify the user of the range that can be input for the distribution frame rate. By limiting the range of the distribution frame rate according to the amount of motion, it is possible to allow for adjustment of the amount of data according to motion in a video.

Sixth Embodiment

In each of the following embodiments and variations including the present embodiment, description is given regarding differences from the fifth embodiment, and assume that it is similar to the fifth embodiment unless otherwise stated below. In the fifth embodiment, the setting of the distribution frame rate for each image region is performed in accordance with a user operation. In the present embodiment, the monitoring camera 51000 sets the distribution frame rate for each image region. The processing performed by the monitoring camera 51000 to set the distribution frame rate for each image region will be described with reference to the flowchart of FIG. 18.

In step S56001, the system control unit 51003 obtains a "maximum frame rate setting value a defined by the stream" that is registered in advance in the storage unit 51009. In step S56002, the system control unit 51003 obtains a setting value (a/2) and stores the setting value in the storage unit 51009. Hereinafter, a distribution frame rate for the setting value a is referred to as a "high distribution frame rate", and a distribution frame rate for the setting value (a/2) is referred to as a "low distribution frame rate".

The processing for step S56003 to step S56007 is performed while image distribution is repeatedly performed for each of the image regions 53002, 53003, and 53004. That is, processing for step S56003 to step S56007 is performed for the still time period corresponding to the image region 53002, and then processing for step S56003 to step S56007 is performed for the still time period corresponding to the image region 53003. Next, processing for step S56003 to step S56007 is performed for the still time period corresponding to the image region 53004. This sequence is then repeated.

In step S56004, the system control unit 51003 determines whether or not the still time period corresponding to the image region of interest (one of the image regions 53002, 53003, and 53004) is equal to or less than a threshold t. The threshold t is obtained in advance and stored in the storage unit 51009, and is, for example, a time period obtained by dividing an average still time period, which is obtained by dividing a total time period of the respective still time periods of the image regions 53002, 53003, and 53004 by 3, by 2.

As a result of this determination, when the still time period corresponding to the image region of interest is equal to or less than the threshold t, the process proceeds to step S56005, and when the still time period corresponding to the image region of interest is larger than the threshold t, the process proceeds to step S56006.

In step S56005, the system control unit 51003 sets the distribution frame rate corresponding to the image region of interest to (a/2). On the other hand, in step S56006, the system control unit 51003 regards the image region of interest as an image region with a high level of interest, and sets the distribution frame rate corresponding to the image region of interest to a. The distribution frame rate corresponding to each image region is stored in the storage unit 51009 by the system control unit 51003.

Figure 18:
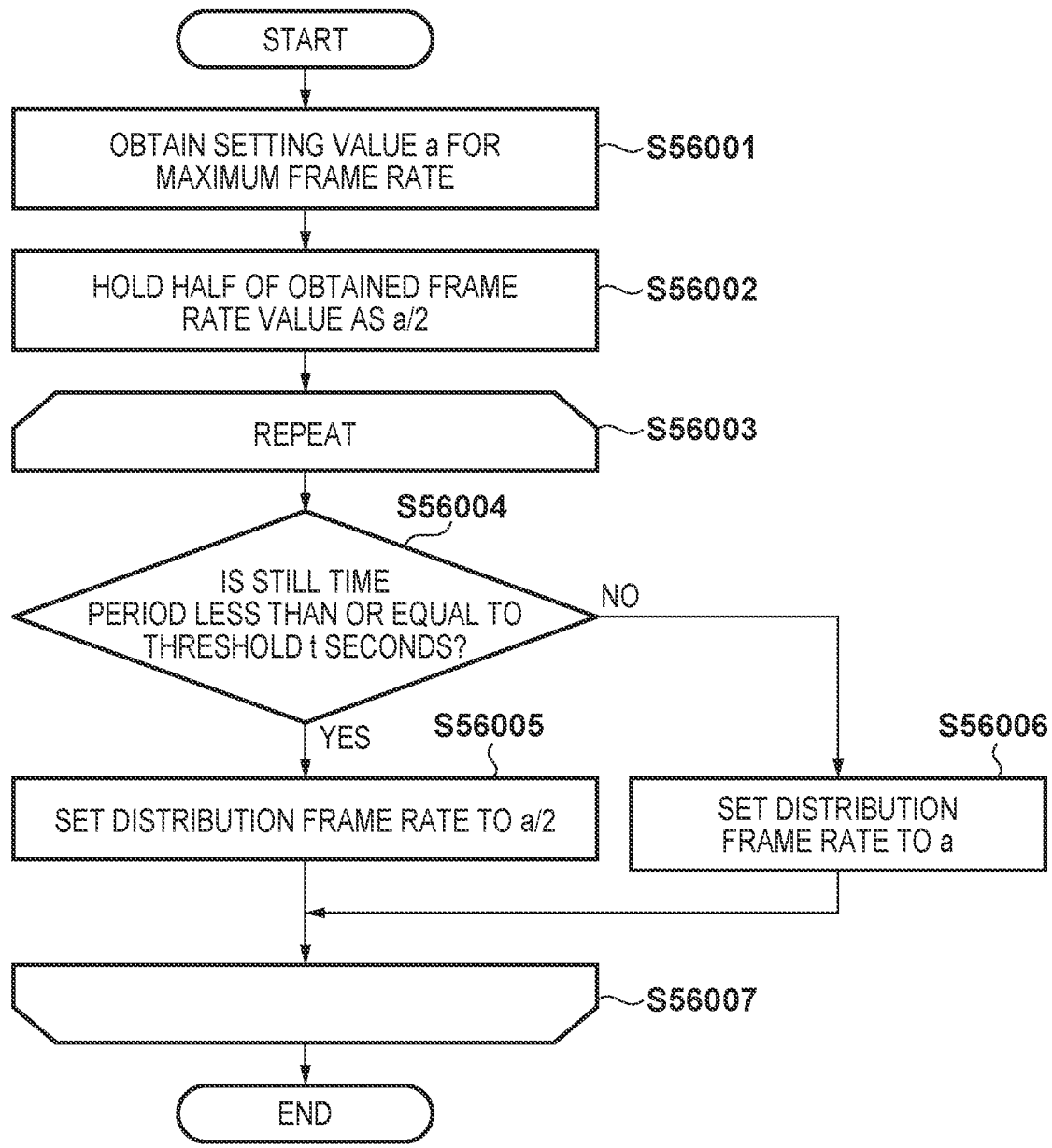
FIG. 18 is a flowchart of processing for setting a distribution frame rate, for each image region.
Figures 19, 20:
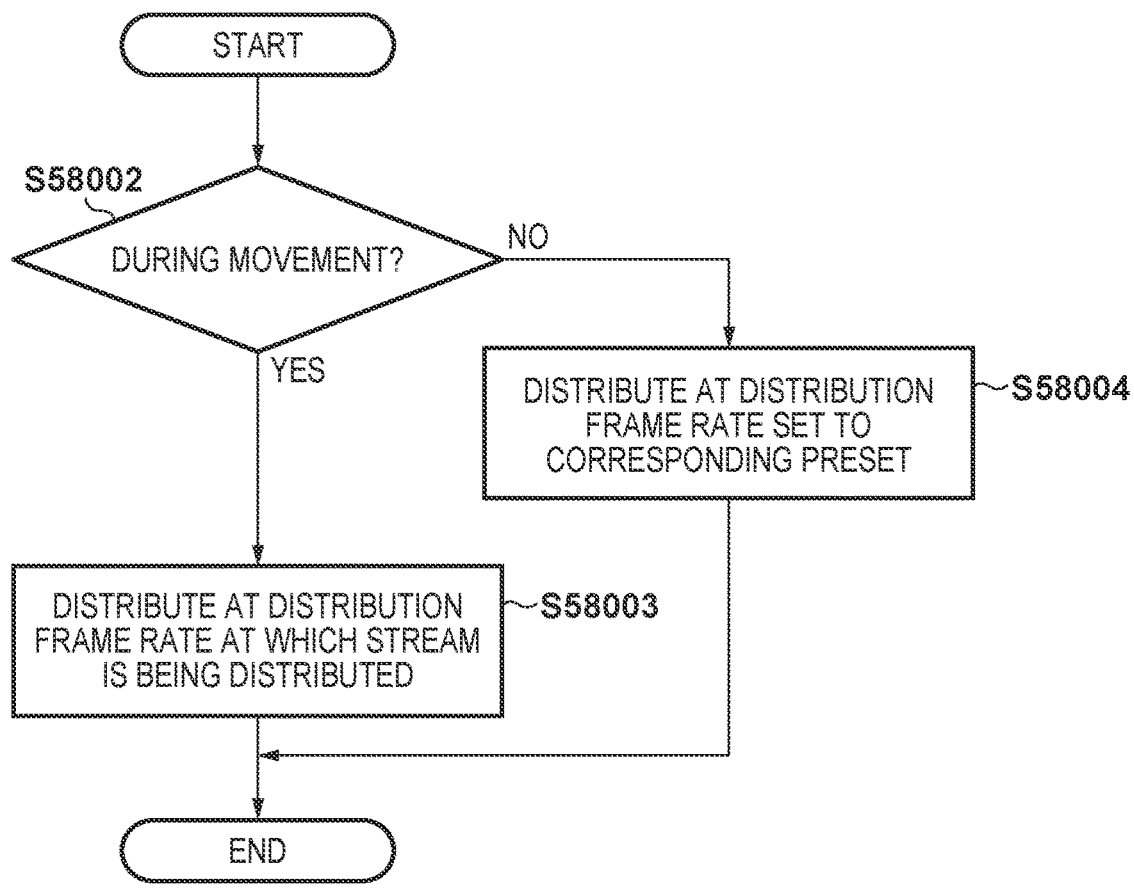
FIG. 19 is a diagram illustrating an example of distribution frame rates.
FIG. 20 is a flowchart of processing for setting a distribution frame rate during movement.

FIG. 19 illustrates an example of the distribution frame rate set by the processing according to the flowchart of FIG. 18. A table 57001 in FIG. 19 represents the still time period (still time period (seconds)) and the distribution frame rate (frame rate (fps)) for image regions (image region A to E) having "number" of "1" to "5", respectively. Here, the threshold t=5, and the setting value a=30 (maximum frame rate that can be distributed by a stream).

The distribution frame rate corresponding to the image regions B and D in which the still time period is equal to or less than the threshold t=5 is a/2=15. In contrast, the distribution frame rate corresponding to the image regions A, C, and E in which the still time period is larger than the threshold t=5 is a=30.

As described above, according to the present embodiment, it is possible to distribute the video of a region with a low level of interest or a region with a small amount of change between frames (that is, a region in which a relatively short still time period is set) at a low distribution frame rate. On the other hand, it is possible to distribute the video of a region with a high level of interest or a region with a large amount of change between frames (that is, a region in which a relatively long still time period is set) at a high distribution frame rate. This makes it possible to reduce the amount of data and the network load.

<Variation of Sixth Embodiment>

In the sixth embodiment, the distribution frame rate is set based on the still time period of an image region. However, the method of setting the distribution frame rate is not limited to this method, and for example, the distribution frame rate may be set in accordance with an amount of motion in accordance with moving object detection, or a setting for auto slow shutter or auto scene.

For example, if the amount of motion from the video in the image region is smaller than a threshold in accordance with moving object detection, the distribution frame rate for the image region is set to the low distribution frame rate, and if the amount of motion is equal to or larger than the threshold, the distribution frame rate for the image region is set to the high distribution frame rate.

In the case of auto slow shutter, when the distribution frame rate is larger than the shutter speed, the distribution frame rate is reduced to match the shutter speed. Next, in auto scene, for example, in the case of motion priority, the distribution frame rate is increased. In addition, when the shutter speed is lowered in the auto scene in the environment of low illuminance, and when the distribution frame rate is higher than the shutter speed, the distribution frame rate is lowered to match the shutter speed.

Seventh Embodiment

Switching the image region whose video is to be distributed takes time. In particular, the operation of changing the pan, tilt, and zoom of the monitoring camera 51000 to make an image region be a capturing region takes time. In the case where video distribution is also performed while the pan, tilt, and zoom of the monitoring camera 51000 are changing (are moving), the distribution video becomes non-consecutive as the distribution frame rate during movement becomes lower. Therefore, in the present embodiment, the above-mentioned setting value a is set to a distribution frame rate for during movement.

The processing performed by the monitoring camera 51000 to set the distribution frame rate during movement will be described with reference to the flowchart of FIG. 20. In step S58002, the system control unit 51003 determines whether or not any of the pan, tilt, and zoom of the monitoring camera 51000 is changing (moving). As a result of this determination, if any of the pan, tilt, and zoom is moving, the process proceeds to step S58003, and if they are not moving, the process proceeds to step S58004.

In step S58003, the system control unit 51003 sets the setting value a for the present distribution frame rate, thereby distributing video to be distributed during movement at the highest distribution frame rate at which video can be distributed in a stream.

In step S58004, the system control unit 51003 sets the distribution frame rate corresponding to an image region for the destination of movement, and thereby distributes the video distributed during movement at the distribution frame rate corresponding to the image region for the destination of movement.

As described above, according to the present embodiment, even when video distribution is performed at a distribution frame rate lower than the maximum distribution frame rate that can be distributed by a stream as in the fifth and sixth embodiments, it is possible to distribute video more continuously during movement.

Eighth Embodiment

When the user obtains a control right to change the pan, tilt, and zoom of the monitoring camera 51000, the user can change the pan, tilt, and zoom of the monitoring camera 51000 by operating, for example, an operation unit (not illustrated) provided in the monitoring camera 51000. In this case, similarly to in the seventh embodiment, there is a problem that, when video distribution is also performed while the pan, tilt, and zoom of the monitoring camera 51000 are changing (are moving), the distribution video becomes non-consecutive as the distribution frame rate during movement becomes lower. Therefore, in the present embodiment, in a duration while the user is obtaining the control right to change the pan, tilt, and zooming of the monitoring camera 51000, the above-mentioned setting value a is set to the distribution frame rate. It is similar for the case where the switching of an image region for which video is to be distributed is implemented by switching a region to be cut out from a captured image.

The processing performed by the monitoring camera 51000 to set the distribution frame rate will be described with reference to the flowchart of FIG. 21. In step S59002, the system control unit 51003 determines whether or not a user is obtaining a control right for changing the pan, tilt, and zoom of the monitoring camera 51000. As a result of this determination, if the user is obtaining the control right, the process proceeds to step S59003, and if the user is not obtaining the control right, the process proceeds to step S59004.

For example, the user can obtain the aforementioned control right by operating an operation unit (not illustrated) provided in the monitoring camera 51000 and inputting an instruction to transition to a mode for "a user to change the pan, tilt, and zoom of the monitoring camera 51000". Meanwhile, by inputting an instruction to cancel this mode by operating the operation unit, the above-mentioned control right is returned to the system control unit 51003.

In step S59003, the system control unit 51003 sets the above-described setting value a to the present distribution frame rate, thereby distributing video at the highest distribution frame rate at which video can be distributed in a stream.

In step S59004, the system control unit 51003 sets a distribution frame rate corresponding to an image region that has recently moved, and thereby distributes the video at the distribution frame rate corresponding to an image region that has recently moved.

As described above, according to the present embodiment, even when video distribution is performed at a frame rate lower than the maximum frame rate at which video can be distributed in a stream as in the fifth and sixth embodiments, it is possible to distribute video more continuously during movement.

Ninth Embodiment

In the embodiment described above, when processing such as preset cycle in which image regions are sequentially switched and video distribution is performed is stopped, the video is distributed at the maximum frame rate that can be distributed in a stream (the above-described setting value a is set to the distribution frame rate).

In the embodiments described above, a case of setting and controlling the distribution frame rate has been described, but in addition to or instead of the distribution frame rate, for example, a bit rate and a video recording frame rate of the image region may be set and controlled.

Further, in the embodiments described above, setting and control of distribution relating to a still time period are described, but there is no limitation to this. The target may be any one of a still time period, a consecutive-display time period on the GUI, and a time period from the start to the end of the timer function after a predetermined time period.

In addition, a video distribution destination is not limited to the client apparatus 52000, and the monitoring camera 51000 may distribute video to another other device instead of or in addition to the client apparatus 52000.

Also, the monitoring camera 51000 and the client apparatus 52000 may be integrated to form a single device, in which case the integrated device executes the respective operations of the monitoring camera 51000 and the client apparatus 52000.

Part of the operation of one apparatus out of the monitoring camera 51000 and the client apparatus 52000 may be performed by the other apparatus, and processing performed by each of the monitoring camera 51000 and the client apparatus 52000 is not limited to the above example.

In addition, some or all of the above-described embodiments and variations may be used in combination as appropriate. In addition, each of the embodiments and each of the variations described above may be selectively used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-230305, filed on Dec. 7, 2018, and Japanese Patent Application No. 2018-230306, filed on Dec. 7, 2018 which are hereby incorporated by reference herein in their entirety.

What is claimed is:

1. An image processing apparatus comprising:
an obtainment unit configured to obtain a captured image captured by an image capturing unit; and
a control unit configured to set, as a distribution target image which is to be distributed, an image of a partial region cut out from the captured image or an image obtained by capturing the partial region by controlling at least one of panning, tilting, and zooming of the image capturing unit, and, based on one of a distribution frame rate of the distribution target image and a set time period for distributing the distribution target image, control the other of the distribution frame rate and the set time period, wherein the distribution target image is distributed for the set time period in accordance with the distribution frame rate.

2. The image processing apparatus according to claim 1, wherein a plurality of distribution target images are set for the captured image, and wherein the control unit switches between each of the plurality of the distribution target images to distribute the plurality of distribution target images in a predetermined order.

3. The image processing apparatus according to claim 1, wherein, when the set time period is smaller than an inverse of the distribution frame rate, the control unit sets the set time period to the inverse of the distribution frame rate.

4. The image processing apparatus according to claim 1, wherein the control unit distributes one frame upon switching to a partial region of interest, and distributes one frame when elapsed time since a latest frame distribution has reached a set time period that is set for the partial region of interest.

5. The image processing apparatus according to claim 1, wherein, when a frame interval corresponding to a partial region having a shortest set time period among the partial regions cut out from the captured image is longer than the shortest set time period, the control unit changes the distribution frame rate of each partial region cut out from the captured image to an inverse of the shortest set time period.

6. The image processing apparatus according to claim 1, wherein the control unit makes a notification of a warning if the set time period is smaller than an inverse of a distribution frame rate set by a user.

7. The image processing apparatus according to claim 6, wherein the control unit displays a range for the set time period so that the set time period will be larger than the inverse of the distribution frame rate.

8. The image processing apparatus according to claim 1, wherein the control unit makes a notification of a warning if a set time period that is set by a user is less than an inverse of the distribution frame rate.

9. The image processing apparatus according to claim 8, wherein the control unit displays a range for the distribution frame rate so that the set time period will be larger than the inverse of the distribution frame rate.

10. An image processing method, comprising:
obtaining a captured image captured by an image capturing unit,
setting, as a distribution target image which is to be distributed, an image of a partial region cut out from the captured image or an image obtained by capturing the partial region by controlling at least one of panning, tilting, and zooming of the image capturing unit, and, based on one of a distribution frame rate of the distribution target image and a set time period for distributing the distribution target image, controlling the other of the distribution frame rate and the set time period, wherein the distribution target image is distributed for the set time period in accordance with the distribution frame rate.

11. A non-transitory computer-readable storage medium storing a computer program for causing a computer to function as:
   an obtainment unit configured to obtain a captured image captured by an image capturing unit; and
   a control unit configured to set, as a distribution target image which is to be distributed, an image of a partial region cut out from the captured image or an image obtained by capturing the partial region by controlling at least one of panning, tilting, and zooming of the image capturing unit, and, based on one of a distribution frame rate of the distribution target image and a set time period for distributing the distribution target image, control the other of the distribution frame rate and the set time period, wherein the distribution target image is distributed for the set time period in accordance with the distribution frame rate.

* * * * *